US009196288B2

(12) United States Patent
Furomoto et al.

(10) Patent No.: US 9,196,288 B2
(45) Date of Patent: Nov. 24, 2015

(54) PROCESS AND APPARATUS FOR PRODUCING OPTICAL RECORDING MEDIUM

(75) Inventors: Shigeyuki Furomoto, Minato-ku (JP);
Masafumi Aga, Minato-ku (JP);
Toshifumi Kawano, Minato-ku (JP);
Hideharu Takeshima, Minato-ku (JP);
Yukari Kiritou, Minato-ku (JP);
Atsushi Komura, Minato-ku (JP); Kumi Mizuno, Minato-ku (JP); Yumi Matsumura, Minato-ku (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 380 days.

(21) Appl. No.: 12/443,014

(22) PCT Filed: Sep. 21, 2007

(86) PCT No.: PCT/JP2007/068442
§ 371 (c)(1),
(2), (4) Date: Jun. 5, 2009

(87) PCT Pub. No.: WO2008/041526
PCT Pub. Date: Apr. 10, 2008

(65) Prior Publication Data
US 2010/0090358 A1  Apr. 15, 2010

(30) Foreign Application Priority Data

Sep. 26, 2006  (JP) .................................. 2006-260963

(51) Int. Cl.
*B29C 59/02* (2006.01)
*G11B 7/26* (2006.01)
(Continued)

(52) U.S. Cl.
CPC .............. *G11B 7/263* (2013.01); *G11B 7/2463* (2013.01); *G11B 7/2467* (2013.01); *G11B 7/259* (2013.01)

(58) Field of Classification Search
CPC ..... B29C 59/026; B29D 17/005; G11B 7/263

USPC ............................................ 264/1.33, 2.3, 2.6
See application file for complete search history.

(56) References Cited

U.S. PATENT DOCUMENTS

2003/0009002 A1*  1/2003  Inoue et al. .................... 528/196
2003/0011087 A1*  1/2003  Kerfeld et al. ................ 264/1.33
(Continued)

FOREIGN PATENT DOCUMENTS

JP    1-275019     11/1989
JP    2 54447       2/1990
(Continued)

OTHER PUBLICATIONS

Office Action issued Apr. 16, 2011, in Taiwan Patent Application No. 096135885 (with English translation).
(Continued)

*Primary Examiner* — James Sanders
(74) *Attorney, Agent, or Firm* — Oblon, McClelland, Maier & Neustadt, L.L.P.

(57) ABSTRACT

To produce an optical recording medium having a good concavo-convex shape whereby optical information recording/retrieving is stabilized.
A process for producing an optical recording medium 100 provided with an interlayer 104 having a concavo-convex shape, which comprises a step of forming a recording layer 102 on a substrate 101 directly or via another layer; a step of placing a resin material layer 104*a* and a stamper 110 having a concavo-convex shape for transfer, in this order on the recording layer 102, and curing the resin material layer 104*a* in this laminated state to obtain a bonded body 112 comprising the substrate 101, the recording layer 102, the resin material layer 104*a* and the stamper 110, and a step of separating the stamper 110 from the resin material layer 104*a* so that the concavo-convex shape for transfer is transferred to the resin material layer 104*a*, and applying surface modification treatment to promote the curing of the resin material layer 104*a*, to form the interlayer 104.

8 Claims, 3 Drawing Sheets

(51) Int. Cl.
  *G11B 7/2463* (2013.01)
  *G11B 7/2467* (2013.01)
  *G11B 7/259* (2013.01)

(56) References Cited

U.S. PATENT DOCUMENTS

| 2004/0004300 A1 | 1/2004 | Yamaguchi et al. |
| 2004/0246884 A1* | 12/2004 | Komaki et al. ............... 369/288 |
| 2006/0145373 A1 | 7/2006 | Kiyono et al. |

FOREIGN PATENT DOCUMENTS

| JP | 2000 251335 | 9/2000 |
| JP | 2002-279707 | 9/2002 |
| JP | 2002 367235 | 12/2002 |
| JP | 2002-367235 A * | 12/2002 | ............... G11B 7/26 |
| JP | 2003-77191 | 3/2003 |
| JP | 2003-85839 | 3/2003 |
| JP | 2003-203402 | 7/2003 |
| JP | 2004-39136 | 2/2004 |
| TW | 200631985 | 9/2006 |
| WO | WO 2005/048253 A1 | 5/2005 |

OTHER PUBLICATIONS

Japanese Office Action issued Aug. 2, 2011, in Patent Application No. 2007-248459 (with English-language translation).
Kashiwagi et al, *Origin Technical Journal*, (2014), No. 77, pp. 111-3 and 111-24.
Machine English translation of JP2002-367235.
Manual partial English translation of JP2002-367235 (paragraphs [0003] and [0006] + Figs. 1-5 w/handwritten annotations).

* cited by examiner

PROCESS AND APPARATUS FOR PRODUCING OPTICAL RECORDING MEDIUM

TECHNICAL FIELD

The present invention relates to a process for producing an optical recording medium. Particularly, it relates to a process and apparatus for producing a laminated multilayer optical recording medium with good recording performance.

BACKGROUND ART

In recent years, it has been desired to develop an optical recording medium on which information can be recorded at a higher density as compared with a conventional one in order to record and retrieve a large quantity of data such as a long and high quality animation. Such an optical recording medium on which information can be recorded at a high density may, for example, be a laminated multilayer optical recording medium such as DVD-ROM having a laminated structure wherein two recording layers (dual layer) are formed on one medium. Employing such multilayer technology, it is possible to increase the capacity without changing the recording density per layer.

Such a laminated multilayer optical recording medium is produced usually by a production process called photopolymerization process (hereinafter sometimes referred to as "2P process"). By the 2P process, a two-layer structure optical recording medium is produced, for example, by forming on a transparent first substrate having a concavo-convex shape for record track formed thereon, a first recording layer, a first reflective layer, an interlayer having a concavo-convex shape for record track formed thereon, a second recording layer and a second reflective layer in this order, and finally bonding a second substrate.

In the 2P process, the interlayer is produced usually as follows. First, a light-curable resin material or the like curable by light (the light may, for example, be radiation ray such as ultraviolet ray) is applied to the first reflective layer to form a resin material layer, and then a stamper having a concavo-convex shape to be transferred (hereinafter optionally referred to as "concavo-convex shape for transfer") is disposed thereon. Then, the light-curable resin material or the like is cured, and then the stamper is separated. In such a manner, the concavo-convex shape for transfer of the stamper is transferred on the surface of the light-curable resin to form the interlayer having a concavo-convex shape by the cured product of the curable resin.

Accordingly, in the 2P process, it is required that the stamper after the light-curable resin is cured is smoothly separated. Namely, if problems in production arise in formation of the interlayer having a concavo-convex shape for record track by the 2P process, such that the stamper is hardly separated from the light-curable resin, or that uniformity on the surface of the interlayer decreases even if the stamper is separated therefrom, it is likely that the interlayer will have defects such as scratches or peeling, and optical information can not stably be recorded on and retrieved from the optical recording medium.

Especially in a case where a stamper made of a polycarbonate resin or an acrylic resin is used, it is difficult to separate the stamper from an interlayer formed of e.g. an ultraviolet-curable resin (Patent Documents 1 and 2).

Patent Document 2 proposes to apply a surface coating by an inorganic material to a stamper made of an acrylic resin. And it is disclosed that the above-mentioned separation can thereby be carried out satisfactorily. Further, in the same document, an acrylic stamper is employed wherein a $SiO_2$ dielectric film is formed on the surface of a groove/pit (corresponding to a concavo-convex shape for transfer) of the stamper.

On the other hand, Patent Document 3 proposes that the entire stamper is made of a cyclic polyolefin or polystyrene resin, or at least the surface of the stamper having a matrix pattern (corresponding to a concavo-convex shape for transfer) formed, is made of a cyclic polyolefin or polystyrene resin. And, it is disclosed that it is thereby possible to improve the releasability of the stamper from the interlayer made of a cured product of a radiation-curable resin. Further, Patent Document 3 indicates that a cyclic polyolefin makes the releasability of the stamper particularly good from the interlayer made of a cured product of a radiation-curable resin.

Patent Document 1: WO2005/048253 (paragraph [0100])
Patent Document 2: JP-A-2002-279707 (paragraphs [0021], [0028])
Patent Document 3: JP-A-2003-85839 (paragraphs [0006], [0016], [0046] to [0055], etc.)

DISCLOSURE OF THE INVENTION

Problems that the Invention is to Solve

However, it was found that even if separation between the interlayer and the stamper is facilitated by the methods as disclosed in Patent Documents 2 and 3, in a case where the surface of the groove formed in the interlayer is not completely cured, there may be a case where the concavo-convex shape of the record track will change, or the ratio of concaves to convexes will change at the time of laminating a recording layer. Further, it was found that such a change of the concavo-convex shape, etc. will occur as the time passes. It was thereby possible that the optical information recording/retrieving performance on the optical recording medium tends to be unstable.

It was found that such problems occur particularly distinctly with an optical recording medium of a system wherein an organic dye material is employed as the recording layer. However, heretofore, it was not clearly understood how it is possible to accurately transfer the groove shape formed in the stamper to the interlayer and further to reproduce it in the recording layer.

The present invention has been made in view of the above problems and has an object to provide a process and apparatus for producing an optical recording medium, capable of producing an optical recording medium which has a good concavo-convex shape, whereby information recording/retrieving by light is stabilized.

Means to Solve the Problems

The inventors of the present invention have conducted an extensive study to solve the above problems and as a result, have found such a technique that in the process for producing an optical recording medium by the 2P process, after curing the interlayer, the stamper is separated, and then, surface modification treatment is applied to the interlayer having the concavo-convex shape transferred. And it has been found that by introducing such a technique, it is possible to obtain an interlayer having a good concavo-convex shape even in a case where the stamper is formed of a polycarbonate resin whereby smooth separation used to be difficult. Further, it has been found that by introducing such a technique, the concavo-convex shape of the stamper can be accurately transferred irrespective of the stamper material, and it can further be reproduced as a recording layer.

Namely, the present invention provides a process for producing an optical recording medium provided with an interlayer having a concavo-convex shape, which comprises:

a step of forming a recording layer on which information is to be recorded by applied light, on a substrate directly or via another layer, a step of placing a resin material layer and a stamper having a concavo-convex shape for transfer corresponding to the above concavo-convex shape, in this order on the recording layer directly or via another layer, and curing the resin material layer in this laminated state to obtain a bonded body comprising the substrate, the recording layer, the resin material layer and the stamper, and a step of separating the stamper from the resin material layer so that the concavo-convex shape for transfer is transferred to the resin material layer, and applying surface modification treatment to promote the curing of the resin material layer having transferred the concavo-convex shape for transfer, to form the interlayer.

Here, the surface modification treatment is preferably irradiation treatment and/or heat treatment.

Further, the surface modification treatment is preferably by ultraviolet irradiation with a dose of from 50 to 1,000 mJ/cm$^2$ or by heat treatment at a heating temperature of from 40 to 120° C.

Further, the curing of the resin material layer in the step to obtain a bonded body is preferably curing up to a half-cured state.

Further, the recording layer preferably contains an organic dye material.

Further, the stamper is preferably made of a polycarbonate resin.

Further, the resin material layer is preferably composed of a plurality of resin layers.

Further, it is preferred that the resin material layer is composed of a plurality of resin layers, and the curing of the outermost layer among the plurality of resin layers is curing up to a half-cured state.

In another aspect, the present invention provides an apparatus for producing an optical recording medium comprising at least a substrate, a recording layer and an interlayer having a concavo-convex shape, which comprises:

a means to form the recording layer on the substrate directly or via another layer, a means to form a resin material layer on the recording layer directly or via another layer, a means to cure the resin material layer in such a state that a stamper having a concavo-convex shape for transfer corresponding to the above concavo-convex shape is placed on the resin material layer, to obtain a bonded body comprising the substrate, the recording layer, the resin material layer and the stamper, a means to separate the stamper from the bonded body so that the concavo-convex shape for transfer is transferred to the resin material layer, and a means to apply surface modification treatment to promote the curing of the resin material layer having transferred the concavo-convex shape for transfer.

Effects of the Invention

According to the process and apparatus for producing an optical recording medium of the present invention, it is possible to produce an optical recording medium which has a good concavo-convex shape, whereby information recording/retrieving by light is stabilized.

BRIEF DESCRIPTION OF DRAWINGS

Each of FIGS. 1(a) to (h) is a schematic view to illustrate a preferred example of the process for producing an optical recording medium to which a first embodiment of the present invention is applied.

Each of FIGS. 2(a) and (b) is a schematic view to illustrate a step of forming a resin material layer in the process for producing an optical recording medium to which a second embodiment of the present invention is applied.

EXPLANATION OF SYMBOLS

Figure 1:
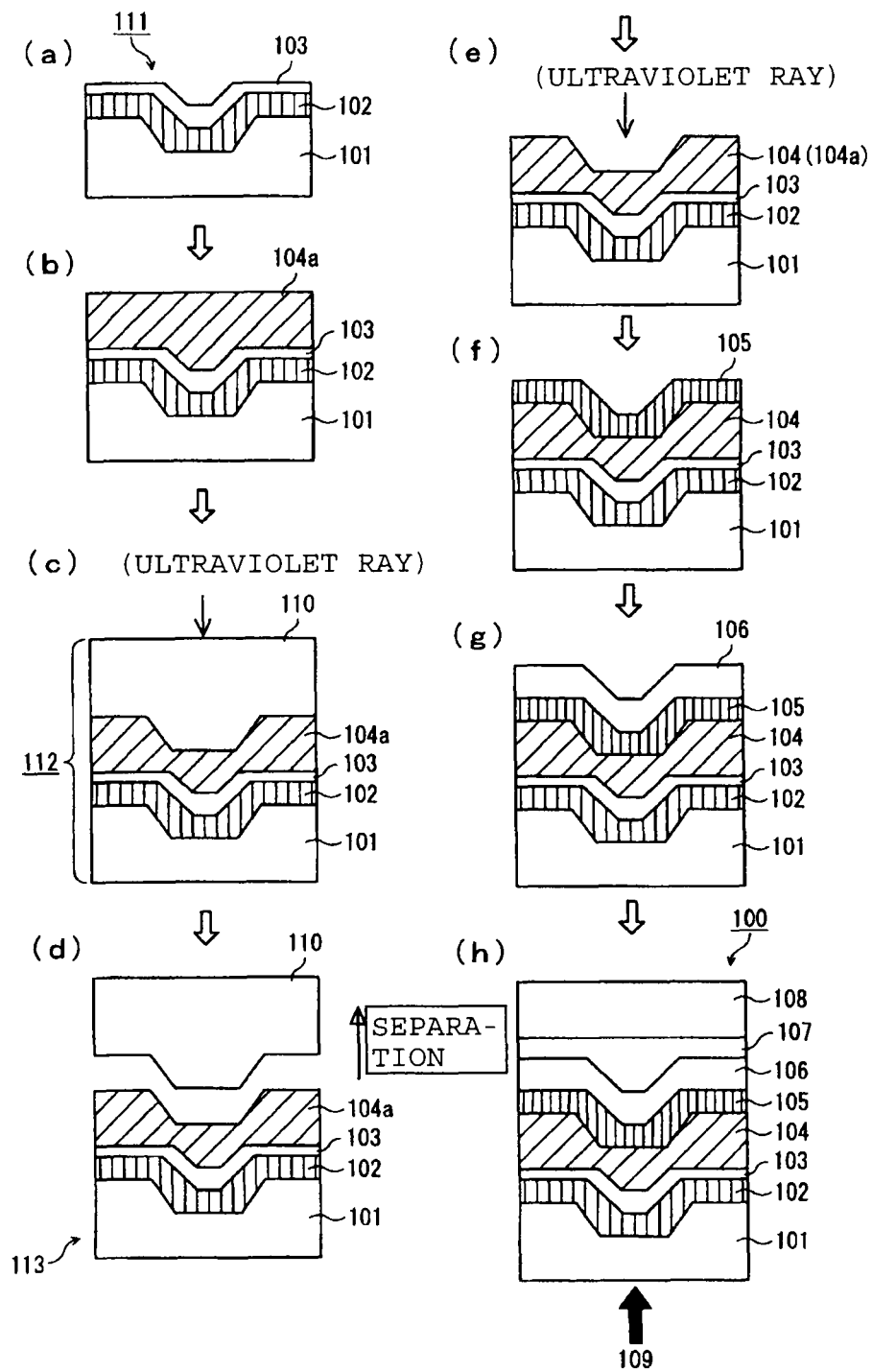

1: Production apparatus
2: Device to form first recording layer
3: Device to form first reflective layer
4: Device to form resin material layer
5: Device to cure resin material layer
6: Device to separate stamper
7: Device to apply surface modification treatment
8: Device to form second recording layer
9: Device to form second reflective layer
10: Device to form second substrate
11: Conveyer
100: Optical recording medium
101: First substrate
102: First recording layer
103: First reflective layer
104: Interlayer
104a: Resin material layer (ultraviolet-curable resin material layer)
$104a_1$: First resin layer
$104a_2$: Second resin layer (outermost resin layer)
105: Second recording layer
106: Second reflective layer
107: Adhesive layer
108: Second substrate
109: Laser beam
110: Stamper
111: Data substrate
112, 112': Bonded body
113: Laminate for optical recording medium

BEST MODE FOR CARRYING OUT THE INVENTION

Now, embodiments of the present invention will be described in detail. However, it should be understood that the present invention is by no means restricted to the following embodiments, and various modifications are possible within the range of the present invention.

I. First Embodiment

FIGS. 1(a) to (h) are schematic views to illustrate a preferred example of the process for producing an optical recording medium to which a first embodiment of the present invention is applied. Here, as an example of a process for producing a laminated multilayer optical recording medium, FIGS. 1(a) to (h) illustrate a process for producing a dual layer type one-side incident type optical recording medium (dual DVD-R or dual DVD recordable disk) having two recording layers containing an organic dye.

First, the construction of the optical recording medium to be produced in this embodiment will be briefly described. As shown in FIG. 1(h), a dual optical recording medium 100 represented by a dual DVD-R comprises a disk-shape light transmitting first substrate 101 and has a structure wherein a first recording layer 102 containing a dye, a translucent first reflective layer 103, a light transmitting interlayer 104 made of an ultraviolet-curable resin, a second recording layer 105 containing a dye, a second reflective layer 106, an adhesive layer 107 and a second substrate 108 forming the outermost layer, are sequentially laminated on this first substrate 101.

Further, on each of the first substrate 101 and the interlayer 104, concaves and convexes are formed, and such concaves and convexes constitute record tracks. Namely, the concavo-convex shape (i.e. the shape of the above-mentioned concaves and convexes) which the first substrate 101 and the interlayer 104 respectively have on their surfaces, constitutes the shape of the record tracks.

Further, it is so designed that recording/retrieving of optical information on the optical recording medium 100 is carried out by a laser beam 109 applied to the first recording layer 102 and the second recording layer 105 from the first substrate 101 side. Namely, the first recording layer 102 and the second recording layer 105 are designed so that information is recorded and retrieved by the laser beam 109 to be applied.

In the process for producing an optical recording medium to which this embodiment is applied, "light transmitting (or transparent)" means a light transmittance at a wavelength of light applied to record/retrieve optical information. Specifically, it means a transmittance of usually at least 30%, preferably at least 50%, more preferably at least 60%, at a wavelength of light for recording/retrieving. On the other hand, the transmittance at a wavelength of light for recording/retrieving is ideally 100%, but is usually a value of 99.9% or below.

Now, the process for producing an optical recording medium according to this embodiment will be described.

The process for producing an optical recording medium according to this embodiment comprises a step of forming a first recording layer, a step of forming a first reflective layer, a step of forming a resin material layer, a step of curing the resin material layer, a step of separating a stamper, a step of applying surface modification treatment, a step of forming a second recording layer, a step of forming a second reflective layer and a step of forming a second substrate.

1. Preparation of Substrate

First, a first substrate 101 is prepared. As the first substrate 101, as shown in FIG. 1(a), one having grooves, lands and prepits formed on the surface by concaves and convexes is prepared. The first substrate 101 may be prepared, for example, by injection molding using e.g. a nickel stamper.

2. Step of Forming First Recording Layer

Then, in the step of forming a first recording layer, a first recording layer 102 is formed on the first substrate 101. The first recording layer 102 is a layer on which information is to be recorded by applied light. The method for forming the first recording layer 102 is not particularly limited, but it may be formed, for example, by the following method. Namely, a coating liquid containing an organic dye is applied to the surface having concaves and convexes of the first substrate 101 by e.g. spin coating. Then, heating or the like is carried out to remove a solvent used for the coating liquid, to form a first recording layer 102. Here, in this embodiment, a case is described wherein the first recording layer 102 is formed directly on the first substrate 101, as mentioned above. However, depending upon the type or construction of the optical recording medium 100, the first recording layer 102 may be formed on the first substrate 101 via one or more other layers.

3. Step of Forming First Reflective Layer

After the first recording layer 102 is formed, in the step of forming a first reflective layer, a first reflective layer 103 is formed on the first recording layer 102. The method for forming the first reflective layer 103 is not particularly limited, but, for example, by sputtering or vapor depositing e.g. an Ag alloy on the first recording layer 102, it is possible to form a first reflective layer 103 on the first recording layer 102.

Thus, by laminating the first recording layer 102 and the first reflective layer 103 in this order on the first substrate 101, a data substrate 111 is obtained. Here, in this embodiment, the data substrate 111 is made to be transparent.

4. Step of Forming Resin Material Layer

Then, in the step of forming a resin material layer, as shown in FIG. 1(b), a resin material layer 104a is formed over the entire surface of the first reflective layer 103 (i.e. the surface of data substrate 111). Namely, the resin material layer 104a is formed on the first recording layer 102 via the first reflective layer 103.

The resin material layer 104a to be formed here is a layer which will constitute an intermediate layer 104 upon completion of the optical recording medium 100 and is a layer formed of a curable resin or its precursor, which is curable by applying some treatment.

As the above curable resin, a curable resin useful for an optical recording medium may optionally be used. Such a curable resin may, for example, be a radiation-curable resin or a heat-curable resin. Among them, an ultraviolet-curable resin as one type of the radiation-curable resin is preferred. In this specification, "radiation" is meant to include electron radiation, ultraviolet radiation, visible radiation and infrared radiation. Such curable resins may be used alone or two or more of them may be used in an optional combination and ratio.

However, the resin material layer 104a will subsequently have concaves and convexes formed on its surface by a stamper 110 (as described hereinafter), and accordingly, before it is shaped in the step of curing the resin material layer, it is in an unshaped state (usually in a liquid state having a predetermined viscosity).

Here, the method for forming the resin material layer 104a is not particularly limited. For example, the resin material layer 104a may be formed by coating by e.g. spin coating a precursor of the curable resin. In this embodiment, a precursor of an ultraviolet curable resin as one of radiation curable resins is applied by spin coating to form a resin material layer (hereinafter sometimes referred to as "ultraviolet curable resin material layer" for convenience in description) 104a.

In this embodiment, a case is described wherein an ultraviolet-curable resin material layer 104a is formed on the first recording layer 102 via the first reflective layer 103 as mentioned above. However, the ultraviolet-curable resin material layer 104a may be formed directly on the first recording layer 102 or may be formed via one or more layers other than the first reflective layer 103, depending upon the type or construction of the optical recording medium 100.

5. Step of Curing Resin Material Layer

Then, in the step of curing a resin material layer, as shown in FIG. 1(c), a stamper 110 is placed on the ultraviolet-curable resin material layer 104a, and the ultraviolet-curable resin material layer 104a is cured. Namely, the stamper 110 is placed on the surface of the ultraviolet-curable resin material layer 104a on the side opposite to the first recording layer 102.

The stamper 110 is a mold having on its surface concaves and convexes (concaves and convexes for transfer) of a shape (a concavo-convex shape for transfer) corresponding to the shape (the concavo-convex shape) of concaves and convexes to be formed on the interlayer 104. And the concavo-convex shape for transfer is designed so that concaves and convexes of a desired concavo-convex shape is formed on the interlayer 104 when the concavo-convex shape for transfer of the concaves and convexes for transfer of the stamper 110 is transferred to the ultraviolet-curable resin material layer 104a.

Further, as the material for the stamper 110, a resin is usually employed in consideration of the production cost of the optical recording medium 100. As will be described hereinafter, the ultraviolet radiation to cure the ultraviolet-curable resin material layer 104a is applied preferably via the stamper 110. Therefore, if an opaque material such as metal is used as the material for the stamper 110, it becomes impossible to apply ultraviolet radiation via the stamper 110, and in such a case, an adverse effect is likely such as deterioration of the respective layers by the ultraviolet radiation.

In this embodiment, as will be described hereinafter, the resin material layer 104a is maintained to be a half-cured state and separation of the stamper 110 is carried out in a heated environment, whereby a merit will be provided such that the degree of freedom in selection of the material to be used for the stamper 110 will be broadened. Namely, heretofore, with a view to minimizing the surface energy when a stamper 110 is formed, it has been considered preferred to use a polyolefin resin, a polystyrene resin or the like as the resin to form the stamper 110. And, those actually practically used are amorphous cyclic polyolefin resins (such as ZEONEX and ZEONOR (both manufactured by ZEON CORPORATION). However, in this embodiment, it is possible to employ a common inexpensive resin such as a polycarbonate resin or an acrylic resin without being limited to the above-mentioned highly functional resin, by carrying out a step of applying surface modification treatment and by carrying out separation of the stamper 110 in a heated environment, as described hereinafter. Here, to carry out the step of applying surface modification treatment and to carry out separation of the stamper 110 in a heated environment may be adopted only one of them alone or both of them in combination to effectively separate the stamper 110 and to make it possible to increase the degree of freedom in selection of the material to be used for the stamper 110.

With a view to having the above merit remarkably provided, it is preferred to employ a polycarbonate resin or an acrylic resin as the material for the stamper 110. More preferred is a polycarbonate resin. As the material for the stamper 110, one type may be used alone or two or more types may be used in an optional combination and ratio.

Further, the stamper 110 is usually formed into a circular disk shape having a center hole formed to pass through at the center from the front to back side. Also in this embodiment, the stamper 110 is one having a circular disk shape, which has a concavo-convex shape for transfer on the front surface and which has a center hole (not shown) formed at the center.

In a case where the stamper 110 is to be prepared, the preparation method is optional. For example, in a case where the stamper 110 is a stamper made of a resin, it may be prepared by e.g. injection molding by using a metal stamper (such as a nickel stamper) having a concavo-convex pattern reversed (negative) to the concavo-convex pattern for transfer of the stamper 110.

Further, the thickness of the stamper 110 to be used in this embodiment is preferably usually at least 0.3 mm from the viewpoint of the dimensional stability and handling efficiency. However, the thickness is usually at most 5 mm. When the thickness of the stamper 110 is within this range, it has a sufficient light transmittance, and it is possible to efficiently cure the ultraviolet-curable resin or the like even by applying ultraviolet radiation via the stamper 110, as described hereinafter, and the productivity can be improved.

Further, the outer diameter of the stamper is usually preferably larger than the outer diameter of the first substrate (which is usually equal to the outer diameter of the optical recording medium 100). When the outer diameter of the stamper 110 is preliminarily designed to be larger than the outer diameter of the first substrate 101, it becomes possible to form the concavo-convex shape for transfer with a good margin along the peripheral portion of the light transmitting stamper 110 extending beyond the outer diameter of the first substrate 101, at the time of preparing the stamper 110 by injection molding, whereby a good concavo-convex shape for transfer can be formed over the entire surface of the stamper 110.

Further, when the outer diameter of the stamper 110 is made larger than the outer diameter of the first substrate 101, the outer diameter of the stamper 110 becomes larger than the outer diameter of the interlayer 104 (and the ultraviolet-curable resin material layer 104a). This makes it possible that the shape of the edge surface of the interlayer 104 is good. That is, if the outer diameter of the stamper 110 is made to be smaller than the outer diameter of the first substrata 101, when the stamper 110 is placed on the ultraviolet-curable resin material layer 104a, the resin of the ultraviolet-curable resin material layer 104a may adhere to the outer peripheral edge portion of the stamper 110. This resin may form a burr when the stamper 110 is separated. Accordingly, when the outer diameter of the stamper 110 is larger than the outer diameter of the interlayer 104 (the ultraviolet-curable resin material layer 104a), the resin present at the edge of the ultraviolet-curable resin material layer 104a which is likely to form a burr is present beyond the outer diameter of the interlayer 104. As a result, even if a burr is formed, the portion where the burr is formed can be removed so as to obtain a good shape of the edge surface of the interlayer 104.

Specifically, the outer diameter of the stamper 110 is made larger than the outer diameter of the first substrate 101 by usually at least 1 mm, preferably at least 2 mm by diameter. However, the extent wherein the outer diameter of the stamper 110 is made larger than the outer diameter of the first substrate 101 is usually at most 15 mm, preferably at most 10 mm, by diameter.

At the time of placing the stamper 110, it is usually placed so that the surface of the stamper 110 having a concavo-convex shape is pressed against the ultraviolet-curable resin material layer 104a. It is also possible that the same material as the ultraviolet-curable resin material layer 104a may be preliminarily applied also to the surface of the stamper 110 having a concavo-convex shape, by e.g. spin coating, and such a coated stamper 110 and the ultraviolet-curable resin material layer 104a may be placed. In order to bring the thickness of the ultraviolet-curable resin material layer 104a to a predetermined range, the pressing force at the time of the placing may be adjusted, or ultraviolet irradiation or heating may be applied at the time of the spin coating.

And, in a state where the stamper 110 is placed on the ultraviolet-curable resin material layer 104a, the ultraviolet-curable resin material layer 104a is cured. In order to cure the ultraviolet-curable resin material layer 104a, ultraviolet radiation may be applied to the ultraviolet curable resin material layer 104a. The method for applying the ultraviolet radiation is not limited, and it may be applied via the stamper 110 or may be applied from the side surface of the ultraviolet-curable resin material layer 104a. Otherwise, it may be applied from the first substrate 101 side. In a case where the ultraviolet radiation is applied from the stamper 110 side, it is industrially preferred to employ as the stamper 110 one capable of transmitting ultraviolet radiation (light-transmitting one). In a case where ultraviolet radiation is applied from the first substrate 101 side, a due care is preferably taken so that the first recording layer 102 will not be damaged by irradiation with the ultraviolet radiation. From the viewpoint of the irradiation efficiency of the ultraviolet radiation and with a view to reducing adverse effects of the ultraviolet radiation to the respective layer materials, it is preferred to apply the ultraviolet radiation via the stamper 110.

In a case where the ultraviolet radiation is applied to the ultraviolet-curable resin material layer 104a, the wavelength of the ultraviolet radiation is not particularly limited so long as it has a peak in the ultraviolet region. Its peak wavelength is usually at least 250 nm, preferably at least 300 nm and usually at most 600 nm, preferably at most 500 nm. If the peak wavelength of the ultraviolet radiation to be applied is shorter or longer than the above range, curing of the ultraviolet-curable resin material layer 104a is likely to be inadequate.

The dose of the ultraviolet radiation is optimized depending upon the constituting materials, composition, etc., of the resin material layer 104a, and it is usually at least 50 mJ/cm$^2$, preferably at least 100 mJ/cm$^2$. If the dose is less than the above range, an uncured portion of the resin tends to be substantial, and a failure in transferring a concavo-convex shape to the resin material layer 104a (consequently to the interlayer 104) is likely to result, such that a groove may be formed at the time of the separation. There is no particular upper limit for the dose of the ultraviolet radiation. However, in a case where the resin material layer 104a is cured to a half-cured state as will be described hereinafter, the upper limit is usually at most 500 mJ/cm$^2$, preferably at most 400 mJ/cm$^2$. If the dose exceeds the above range, the resin tends to be completely cured, whereby separation of the stamper 110 tends to be difficult, whereby a failure in transferring the concavo-convex shape to the resin material layer 104a (consequently to the interlayer 104) is likely to result, such as the separation scratches or formation of a groove. Here, the irradiation time of the ultraviolet radiation is suitably adjusted so that the irradiation dose will be in the above range.

The irradiation intensity of the ultraviolet radiation is optional so long as the effect of the present invention will not be substantially impaired, and it is usually at least 30 mW/cm$^2$, preferably at least 40 mW/cm$^2$ and usually at most 200 mW/cm$^2$, preferably at most 150 mW/cm$^2$. If strong ultraviolet radiation such that the irradiation intensity exceeds the above range, is applied in a short time, the surface modification treatment is likely to be non-uniform, or a physical strain is likely to result. On the other hand, if weak ultraviolet radiation such that the irradiation intensity is less than the above range, is applied for a long time, not only the production efficiency will be low, but also no adequate effects of the surface modification treatment may be obtained.

The method and apparatus for applying ultraviolet radiation to the ultraviolet-curable resin material layer 104a are not particularly limited, and conventional methods and apparatus may be employed.

Further, in the present invention, the curing of the ultraviolet-curable resin material layer 104a by the ultraviolet radiation is preferably curing up to a half-cured state without curing completely. By adjusting the curing of the ultraviolet-curable resin material layer 104a to curing up to a half-cured state, the adhesive force between the stamper 110 and the resin material layer 104a becomes low, whereby separation of the stamper 110, which will be described hereinafter, can be facilitated. By this method, even when a material which is usually difficult to separate, such as a polycarbonate resin, is used as the material for the stamper 110, it becomes possible to separate the stamper 110 satisfactorily. Accordingly, it becomes possible to form a resin material layer 104a having a good concavo-convex shape irrespective of the stamper material, and consequently, it becomes possible to form an interlayer 104 having a good concavo-convex shape.

Here, the curing up to a half-cured state may be judged, for example, by the cured degree of the ultraviolet-curable resin material layer 104a. Specifically, it may be quantitatively determined by measuring the proportion of double bonds remaining in the ultraviolet-curable resin material layer 104a by means of an infrared spectrophotometer (FT-IR) or a Raman spectroscopy. Specifically, the position of absorption of double bonds of an uncured ultraviolet-curable resin is preliminarily specified, and the absorptions before and after the curing of the surface of a film of the ultraviolet-curable resin formed on a stamper, are measured, whereby the ratio of the amounts of double bonds before and after the curing is calculated.

In the present invention, the half-cured state is such that the remaining ratio of double bonds after the curing treatment of the surface of the ultraviolet-curable resin formed on the stamper is usually at most 90%, preferably at most 50%, more preferably at most 30%.

On the other hand, as one of methods to quantitatively judge whether or not the ultraviolet-curable resin material layer 104a is half-cured, there may be mentioned a state where after the curing treatment, the ultraviolet-curable resin material layer 104a has a viscosity. Specifically, there may be mentioned a state where the surface of the ultraviolet-curable resin material layer 104a is sticky, when touched with a finger after the separation of the stamper 110, as will be described hereinafter.

Accordingly, in order to adjust the curing of the ultraviolet-curable resin material layer 104a to curing up to a half-cured state, the above-mentioned conditions for irradiation with ultraviolet radiation, i.e. the irradiation dose, the irradiation intensity and the irradiation time may be suitably optimized.

This embodiment will be described with reference to a case where via the stamper 110, ultraviolet radiation is applied to the ultraviolet-curable resin material layer 104a from the stamper 110 side to polymerize a precursor of the ultraviolet-curable resin, whereby the ultraviolet-curable resin material layer 104a is cured up to a half-cured state.

As described in the foregoing, the above resin material layer 104a is cured to obtain a bonded body 112 comprising a data substrate 111 (i.e. the first substrate 101, the first recording layer 102 and the first reflective layer 103), the ultraviolet-curable resin material layer 104a and the stamper 110.

6. Step of Separating Stamper

In the step of separating a stamper, as shown in FIG. 1(d), the stamper 110 is separated from the ultraviolet-curable resin material layer 104a (see FIG. 1(c)). Thus, the concavo-convex shape for transfer of the stamper 110 is transferred to the ultraviolet-curable resin material layer 104a. And, corresponding to the concavo-convex shape for transfer, thus transferred, the concavo-convex shape will be formed on the interlayer 104. In this specification, the ultraviolet-curable resin material layer 104a is meant for one which is cured after the application and separated from the stamper and which is before the surface modification treatment. Further, the interlayer 104 is meant for one after application of the surface modification treatment after separation of the stamper 110. Accordingly, the ultraviolet-curable resin material layer 104a and the interlayer 104 are the layers formed at the same position but different in their states.

The specific method for separating the stamper 110 is not particularly limited. Usually, in a case where the optical recording medium is a circular disk shape, separation is carried out by a method wherein the inner periphery is vacuum-suctioned, a knife edge is inserted in the inner periphery of the optical recording medium, and while air is supplied thereto, the disk (the after-mentioned laminate 113 for optical recording medium) and the stamper 110 are separated.

Here, the above separation of the stamper 110 may be carried out without controlling the temperature, e.g. at room temperature, or may be carried out in a state where the bonded body 112, is heated. When the stamper 110 is separated under a heated condition, the separation will be facilitated, and a resin material layer 104a having a good concavo-convex shape can be obtained. Consequently, an interlayer 104 having a good concavo-convex shape can be obtained, such being desirable. The timing for carrying out the heating operation is optional, and for example, heating may be initiated before the step of separating the stamper, such as during preparation of the substrate, the step of forming the first recording layer, the step of forming the first reflective layer, the step of forming a resin material layer or the step of curing the resin material layer. However, it is preferred to initiate the heating immediately before the step of separating the stamper or during the step of separating the stamper. It is usually particularly preferred to carry out the heating operation after the step of curing the resin material layer i.e. in the step of separating the stamper. Here, the temperature of the bonded body 112 at the time of separating the stamper 110 is optional, but it is usually preferably at least 50° C., and it is preferably at most the glass transition temperature of the resin material layer 104a (i.e. the interlayer 104) and at most the glass transition temperature of the stamper 110.

Further, even in a case where in the step of curing the resin material layer, the resin material layer 104a is completely cured, if the separation is carried out in a heated state in the step of separating the stamper, separation of the stamper 110 can be carried out satisfactorily. Further, as in this embodiment, even in a case where in the step of curing the resin material layer, the resin material layer 104a is cured up to a half-cured state, if the separation is carried out in a heated state in the step of separating the stamper, the separation of the stamper 110 can be carried out in a more stabilized condition.

Further, the temperature of the bonded body 112 may be measured by a non-contact type thermometer (e.g. non-contact type thermometer IT2-60, manufactured by KEYENCE).

Via the above-described operation, the shape of concaves and convexes for transfer (i.e. a concavo-convex shape for transfer) of the stamper 110 is transferred to the surface of the ultraviolet-curable resin material layer 104a, to obtain a resin material layer 104a and thereby to obtain a laminate 113 for optical recording medium comprising the first substrate 101, the first recording layer 102, the first reflective layer 103 and the resin material layer 104a (see FIG. 1(d)).

7. Step of Applying Surface Modification Treatment

In this embodiment, as shown in FIG. 1(e), after transferring the concavo-convex shape for transfer to the resin material layer 104a by separating the stamper 110, surface modification treatment is applied to the resin material layer 104a, whereby curing of the resin material layer 104a progresses, and the interlayer 104 will be formed. Here, the surface modification treatment is not particularly limited so long as it is treatment to promote the curing of the resin material layer 104a, but it is preferably irradiation treatment and/or heat treatment. Here, among radiations, it is preferred to employ ultraviolet radiation. Accordingly, for example, in a case where the resin material layer 104a is made of an ultraviolet-curable resin, either ultraviolet irradiation or heat treatment may be used as the surface modification treatment, but it is preferred to employ at least ultraviolet irradiation. Further, also in a case where the resin material layer 104a is made, for example, of a thermosetting resin, either ultraviolet irradiation or heat treatment may be employed for the surface modification treatment, but it is preferred to employ at least heat treatment as the surface modification treatment.

Thus, after transferring the concavo-convex shape for transfer, to the resin material layer 104a by separating the stamper 110, the surface modification treatment is applied to the resin material layer 104a, whereby it is possible to promote the curing reaction of the resin material layer 104a to complete the curing thereby to obtain an interlayer 104. Thus, even in a case where the data substrate 111 is held in a state having the stamper 110 separated, the concavo-convex shape transferred to the interlayer 104 will be free from a change, and recording/retrieving of the after-mentioned second recording layer can be stabilized.

The above-mentioned merits of the surface modification treatment are obtainable not only in a case where in the step of curing the resin material layer, curing of the resin material layer 104a is adjusted to be up to a half-cured state, but also in a case where the resin material layer 104a is further cured. Namely, in a case where in the step of curing the resin material layer, curing of the resin material layer 104a is further advanced from the half-cured state, even if the curing is substantially advanced so that, for example, the curing of the resin material layer 104a is completed, very fine uncured portions may sometimes remain for some reason. When such uncured portions are present, the concavo-convex shape is likely to change as the time passes, or particularly when the recording layer is laminated by using a solvent, the thickness ratio of the recording layers laminated on the groove portion and the land portion is likely to change, which is a cause to lower the stability in recording/retrieving of the optical recording medium. However, by carrying out the surface modification treatment, such uncured portions can be cured, and even when the data substrate 111 is held after separation of the stamper and before formation of the second recording layer, it is possible to prevent a change in the concavo-convex shape transferred to the resin material layer 104a and it is possible to stabilize the recording/retrieving of the optical recording medium.

The time from separation of the stamper 110 to application of the surface modification treatment is not particularly limited so long as the effects of the present invention are not substantially impaired, but it is usually within 24 hours, preferably within 12 hours. It is particularly preferred to carry out the surface modification treatment immediately after the separation of the stamper 100. Further, the surface modification treatment may be carried out dividedly in a plurality of times. Even in such a case, the first surface modification treatment is preferably carried out at the above-mentioned timing.

In a case where the surface modification treatment is carried out by ultraviolet irradiation, the wavelength of the ultraviolet radiation is not particularly limited so long as the ultraviolet radiation has a peak within the ultraviolet region.

However, its peak wavelength is usually at least 250 nm, preferably at least 300 nm and usually at most 600 nm, preferably at most 500 nm. If the peak wavelength of the ultraviolet radiation to be irradiated is less or more than the above range, curing of the ultraviolet-curable resin material layer 104a is likely to be inadequate.

The irradiation dose of the ultraviolet radiation may suitably be optimized by e.g. the constituting materials or composition of the resin material layer 104a, or curing conditions, etc. in the above-mentioned step of curing the resin material layer. It is usually at least 50 mJ/cm$^2$, preferably at least 100 mJ/cm$^2$, more preferably at least 200 mJ/cm$^2$, and usually at most 1,000 mJ/cm$^2$, preferably at most 800 mJ/cm$^2$, more preferably at most 500 mJ/cm$^2$. If the irradiation dose of ultraviolet radiation is less than the above range, no adequate surface modification effect may sometimes be obtainable, and if it exceeds the above range, a physical strain may result in the medium due to shrinkage or the temperature rise of the medium.

The irradiation intensity of the ultraviolet radiation is optional so long as the effects of the present invention will not substantially be impaired. However, it is usually at least 50 mW/cm$^2$, preferably at least 200 mW/cm$^2$. If a weak ultraviolet radiation with the irradiation intensity being less than the above range, is applied for a long time, not only the production efficiency tends to be low, but also the reaction rate tends to be low, whereby no adequate effect for the surface modification treatment can be obtained.

In the case where the surface modification treatment is carried out by ultraviolet irradiation, the irradiation method and apparatus are not particularly limited, and a known method and apparatus may be employed in the same manner as in the above-mentioned step of curing the resin material layer.

On the other hand, in a case where the surface modification treatment is carried out by heating, the heating method or apparatus are not particularly limited, but it is preferred to carry out the heating uniformly over the entire surface of the resin material layer 104a. For this purpose, an oven type heating method or a heating system using an infrared radiation lamp, is suitable.

In the case where the surface modification treatment is carried out by heat treatment by means of a heat source such as an oven, the temperature is suitably optimized depending upon the constituting materials or composition of the resin material layer 104a or curing conditions in the above step of curing the resin material layer, but it is usually at least 40° C., preferably at least 50° C., and usually at most 120° C., preferably at most 100° C. If the heating temperature is lower than the above range, no adequate effect for the surface modification may sometimes be obtainable, or in order to obtain an adequate effect for modification, heating for a long time will be required, whereby the production efficiency tends to be low. On the other hand, if the heating temperature exceeds the above range, a physical strain is likely to form in the substrate or the recording layer is likely to be damaged by the heat.

In the case where the heat treatment is carried out by means of a heat source such as an oven, the heating time is usually at least 10 seconds, preferably at least 30 seconds, more preferably at least 1 minute and usually at most 3 hours, preferably at most 2 hours. In a case where high temperature heating is carried out in a short time such that the heating temperature is shorter than the above range, the surface modification treatment tends to be non-uniform, or a physical strain is likely to result. On the other hand, if low temperature heating is carried out for a long time exceeding the above range, not only the production efficiency tends to deteriorate, but also no adequate effect by the surface modification treatment may be obtainable.

Further, as the heat treatment, a heating method by means of infrared radiation is also preferred. In the case of heating by means of infrared radiation, heating can be carried out instantaneously, and a sufficient effect for surface modification treatment can be obtained by heating for a few seconds. Therefore, it is a preferred heating method from the viewpoint of the production efficiency.

In this embodiment, by the surface modification treatment, the resin material layer 104a which is in a half-cured state, will be sufficiently cured. And, via this surface modification treatment step, it is possible that in the laminate 113 for optical recording medium, curing of the resin material layer 104a (i.e. the interlayer 104) can be completed, and even in a case where the laminate 113 for optical recording medium is stored until the next step (here, the step of forming the second recording layer), it is possible to suppress deterioration with time of the interlayer 104.

8. Step of Forming Second Recording Layer

In the step of forming a second recording layer, as shown in FIG. 1(f), a second recording layer 105 is formed on the interlayer 104. The method for forming the second recording layer 105 is not particularly limited, but for example, it may be formed by the following method. Namely, a coating liquid containing an organic dye is applied on the surface of the interlayer 104 by e.g. spin coating. And, heating or the like is carried out in order to remove the solvent used for the coating liquid thereby to form the second recording layer 105. By repeating the operation from "4. STEP OF FORMING RESIN MATERIAL LAYER" to "8. STEP OF FORMING SECOND RECORDING LAYER", a laminated multilayer optical recording medium can efficiently be produced.

Here, this embodiment is described with reference to a case where the second recording layer 105 is formed directly on the interlayer 104, but depending upon the type, construction, etc. of the recording medium 100, the second recording layer 105 may, of course, be formed via one or more other layers (such as a protective and a buffer layer).

9. Step of Forming Second Reflective Layer

In the step of forming a second reflective layer, as shown in FIG. 1(g), a second reflective layer 106 is formed on the second recording layer 105. The method for forming the second reflective layer 106 is not particularly limited, but for example, a second reflective layer 106 may be formed on the second recording layer 105 by sputtering deposition of an Ag alloy or the like.

10. Step of Forming Second Substrate

In the step of forming a second substrate, as shown in FIG. 1(h), a second substrate 108 is formed on the second reflective layer 106. The method for forming the second substrate 108 is not particularly limited, but for example, the second substrate 108 may be formed by bonding to the second reflective layer 106 via an adhesive layer 107. The second substrate 108 is not particularly limited, but here, a mirror surface substrate obtained by injection molding of a polycarbonate is used as the second substrate 108.

Here, the construction of the adhesive layer 107 is optional. For example, the adhesive layer 107 may be transparent or opaque. Further, the surface may be slightly roughened. Further, a slowly curable type adhesive may be used without any particular problem. Further, for example, the adhesive layer 107 may be formed by applying an adhesive on the second reflective layer 106 by a method such as screen printing, followed by irradiation with ultraviolet radiation, and then placing and pressing the second substrate 108. Otherwise, the adhesive layer 107 may be formed by interposing a pressure sensitive double-faced adhesive tape between the second reflective layer 106 and the second substrate 108, followed by pressing.

As described in the foregoing, the production of an optical recording medium 100 is completed. By the process for producing an optical recording medium in this embodiment, it is possible to obtain an optical recording medium 100 having a layered structure as shown in FIG. 1(h). Further, by the process for producing an optical recording medium of the present invention, it is possible to produce a high quality optical recording medium 100 whereby recording/retrieving of information by light is stabilized. Further, by the process for producing an optical recording medium in this embodiment, it is possible to also obtain merits such that it is possible to constantly produce an optical recording medium 100 provided with an interlayer 104 having a good concavo-convex shape with little defects, and it is possible to produce an optical recording medium 100 provided with an interlayer having a good concavo-convex shape irrespective of the material of the stamper 110. Further, by the surface modification treatment, it is possible to obtain not only an effect to stabilize recording/retrieving at the data recording region having a concavo-convex shape, but also to obtain good signal recording characteristics at the region for recording medium-distinguishing signals so-called BCA (burst cutting area). This is considered attributable to such a fact that by the surface treatment, the curing reaction proceeds to increase the elastic modulus of the interlayer 104.

The layer structure shown in FIG. 1(h) is merely an example, and by the process for producing an optical recording medium of this embodiment, for example, an optical recording medium may be produced which has one or more other layers (for example, an underlayer may be inserted between the first substrate 101 and the first recording layer 102) not shown in FIG. 1(h). Further, before, during or after the above-described each step, another step other than the above-described steps may be carried out.

In the foregoing, the process has been described with reference to a one-side incident type optical recording medium of a dual layer type having two recording layers containing an organic dye. However, the process of the present invention can be applied also to the production of an optical recording medium of a so-called film face incident type such as a Blu-ray disk (such as BD-ROM, BD-R or BE-RE). In such a case, a recording laser beam 109 is applied from the upper side of FIG. 1(h), and therefore, in the process for forming layers respectively present upper and lower sides of the interlayer, the order of the step of forming a recording layer and the step of forming a reflective layer is reversed, and instead of the step of forming a second substrate, a step of forming a cover layer will be included.

11. Step of Forming Cover Layer

As the cover layer, a material which is transparent to the recording laser beam and which has little birefringence, is selected for use, and the cover layer is usually formed by bonding a plastic plate (hereinafter sometimes referred to as "a cover layer sheet") by means of an adhesive, or by applying a liquid material, followed by curing by means of light, radiation or heat.

As the plastic to be used as a material for the cover layer, an optional material may be used so long as it is a material which is transparent to the recording laser beam and which has little birefringence. For example, a polycarbonate, a polyolefin, an acrylic resin, cellulose triacetate or a polyethylene terephthalate may be mentioned. Further, for bonding, light or radiation curing, a heat-curable resin or a pressure sensitive adhesive may, for example, be employed. As the pressure sensitive adhesive, for example, adhesive agents made of various polymers of e.g. acrylic type, methacrylate type, rubber type, silicon type and urethane type may be used. The materials for the cover layer may be used alone or two or more of them may be used in an optional combination and ratio.

A specific method for bonding the cover layer sheet is optional. For example, a photocurable resin to constitute an adhesive layer is dissolved in a suitable solvent to prepare a coating liquid, which is applied on a recording layer to form a coating film, and then a polycarbonate sheet is overlaid on the coating film. Then, as the case requires, in the overlaid state, the medium is rotated to further stretch and spread the coating liquid and then irradiated and cured with ultraviolet radiation by means of an UV lamp. Otherwise, a pressure sensitive adhesive may be applied preliminarily on a cover layer sheet, and such a cover layer sheet is overlaid on the recording layer and then pressed with a proper pressure for press-bonding.

As such an adhesive agent, an acrylic or methacrylic type polymer adhesive agent is preferred from the viewpoint of the transparency and durability. More specifically, an adhesive agent obtainable by copolymerizing a main component monomer such as 2-ethylhexyl acrylate, n-butyl acrylate or iso-octyl acrylate with a polar monomer such as acrylic acid, methacrylic acid, an acrylamide derivative, maleic acid, hydroxylethyl acrylate or diglycidyl acrylate, is preferred. By adjusting the molecular weight of the main component monomer, by mixing a short chain component or by adjusting the crosslinking point density by acrylic acid, the physical properties such as the glass transition temperature Tg, the tackiness (the adhesive force immediately formed when contacted under a low pressure), the peel strength, the shear retention, etc., can be controlled. As a solvent for an acrylic polymer, ethyl acetate, butyl acetate, toluene, methyl ethyl ketone or cyclohexane may, for example, be used. The above adhesive agent preferably further contains a polyisocyanate type crosslinking agent. Further, such adhesive agents may be used alone or two or more of them may be used in an optional combination and ratio.

As the adhesive agent, the above-mentioned material may be employed, and such an adhesive agent is uniformly applied in a predetermined amount on the surface on the recording layer side of the cover layer sheet, and after drying the solvent, bonded to the recording layer side surface (in a case where an interface layer is present, on its surface) and cured by applying a pressure by e.g. a roller. Further, in a case where a cover layer sheet coated with the adhesive agent is bonded to the surface of a recording medium having a recording layer formed, it is preferred to carry out bonding in vacuum to avoid formation of bubbles by inclusion of air.

Further, the above adhesive agent may be applied on a release film, and after drying the solvent, a cover layer sheet is bonded, and the release film is separated to integrate the cover layer sheet and the adhesive layer, followed by bonding to a recording medium.

In a case where a cover layer is formed by coating, a spin coating method or a dipping method may, for example, be used. It is particularly preferred to employ a spin coating method for a disk-shaped medium. In the case of forming a cover layer by coating, as the material for the cover layer, a urethane, epoxy or acrylic resin may, for example, be used, and after coating, ultraviolet ray, electron beam or radiation may be applied to promote radical polymerization or cationic polymerization for curing.

II. Second Embodiment

In the process for producing an optical recording medium of the present invention, the resin material layer may be formed from a plurality of resin layers taking into consideration the warpage of the optical recording medium, the recording performance of the recording layer to be formed on the interlayer, etc. In such a case, among the plurality of resin layers constituting the resin material layer, the resin layer having a concavo-convex shape formed by the stamper, becomes the outermost resin layer.

In the case where the resin material layer is constituted by a plurality of resin layers, the number of resin layers constituting the resin material layer is not particularly limited. Specifically, the number of such resin layers is usually at most 10 layers, preferably at most 5 layers, more preferably at most 4 layers. On the other hand, the number of such resin layers is at least two layers. From the viewpoint of the production efficiency, the number of resin layers constituting the resin material layer is preferably at least two layers and at most 5 layers. Particularly preferred from the viewpoint of the production efficiency is such that the number of resin layers constituting the resin material layer is two layers or three layers.

Now, a case where the resin material layer is constituted by two resin layers, will be described with reference to the second embodiment. In the following second embodiment, as compared with the first embodiment, the method for forming the resin material layer and the method of placing the stamper, are changed. Here, with respect to the resin to form the resin material layer 104, one employing an ultraviolet-curable resin in the same manner as in the first embodiment, will be described.

Figure 2:
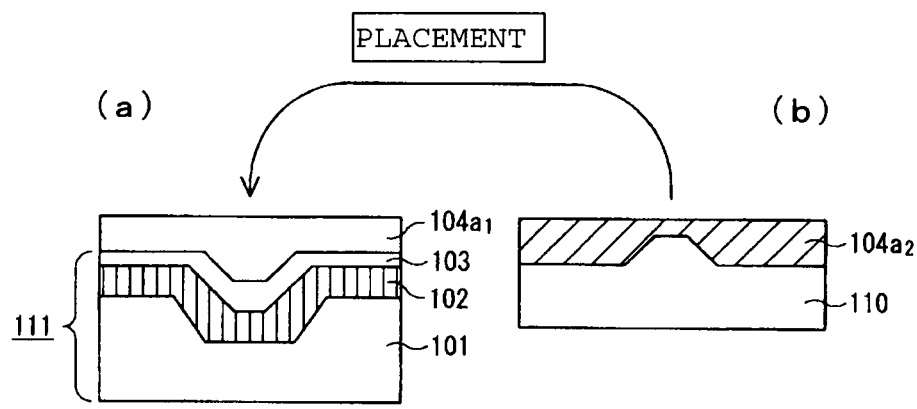

In this embodiment, preparation of the substrate, the step of forming a first recording layer and the step of forming a first reflective layer are, respectively, carried out in the same manner as in the first embodiment, and then, a step of forming a resin material layer is carried out. FIGS. 2(a) and (b) are schematic views to illustrate the step of forming the resin material layer in the process for producing an optical recording medium, to which the second embodiment of the present invention is applied. In FIGS. 2(a) and (b), the same portions as in FIGS. 1(a) to (h) will be represented by the same symbols as in FIGS. 1(a) to (h).

Figure 3:
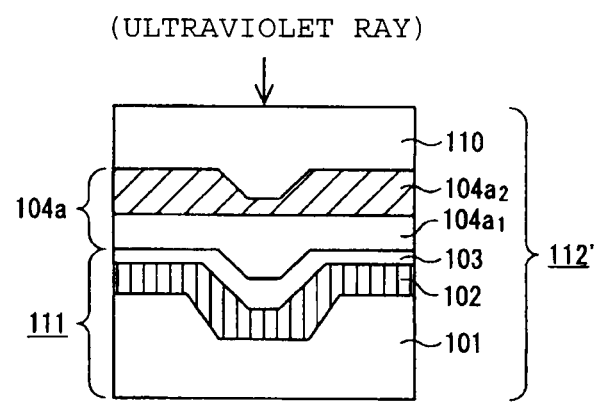
FIG. 3 is a schematic view to illustrate a step of curing a resin material layer in the process for producing an optical recording medium to which the second embodiment of the present invention is applied.

In the process of this embodiment, in the step of forming a resin material layer, as shown in FIGS. 2(a) and (b), a stamper 110 having a second resin layer $104a_2$ as the outermost resin layer, is placed on a data substrate 111 having a first resin layer $104a_1$ formed on its surface, to form a ultraviolet-curable resin material layer 104a comprising the first resin layer $104a_1$ and the second resin layer $104a_2$ (see FIG. 3). Namely, the stamper 110 having the second resin layer $104a_2$ formed as the outermost layer is placed on the first resin layer $104a_1$ in such a state that the stamper 110 is placed on the ultraviolet-curable resin material layer 104a. Now, this point will be described in detail.

Namely, in order to form the ultraviolet-curable resin material layer 104a, as shown in FIG. 2(a), a ultraviolet-curable resin is applied on the data substrate 111 comprising the first substrate 101, the first recording layer 102 and the first reflective layer 103, and a first resin layer $104a_1$ is formed by e.g. spin coating. Here, the method for producing the data substrate 111 is the same as in the first embodiment.

Here, the degree for curing the first resin layer $104a_1$ is not particularly limited, and curing may be sufficiently completed at the stage of placing the second resin layer $104a_2$, or may be in a half-cured state. At the stage of placing the second resin layer $104a_2$, if the first resin layer $104a_1$ has already been sufficiently cured, the thickness of the ultraviolet-curable resin material layer 104a to be formed from the first resin layer $104a_1$ and the second resin layer $104a_2$ can easily be controlled to form a uniform layer thickness. Further, at the stage of placing the second resin layer $104a_2$, if the first resin layer $104a_1$ is in a half-cured state, it is possible to improve the affinity of the interface between the first resin layer $104a_1$ and the second resin layer $104a_2$.

On the other hand, on the stamper 110, as shown in FIG. 2(b), an ultraviolet-curable resin is applied on the surface on the side having a concavo-convex shape for transfer, to form a second resin layer $104a_2$ by e.g. spin coating. Here, as the stamper 110, the same one as used in the first embodiment may be used. Further, in this embodiment, a concavo-convex shape will be formed on this second resin layer $104a_2$, and the second resin layer $104a_2$ will function as the outermost resin layer.

Further, the method for forming the second resin layer $104a_2$ is not particularly limited, but it may be formed over the entire surface of the stamper 110 by applying a precursor of the ultraviolet-curable resin by e.g. spin coating.

Then, the stamper 110 having the second resin layer $104a_2$ formed, is bonded to the data substrate 111 having the first resin layer $104a_1$ formed, so that the first resin layer $104a_1$ and the second resin layer $104a_2$ face each other. At that time, in order to adjust the thickness of the ultraviolet-curable resin material layer 104a to be within a predetermined range, it is conceivable, for example, to carry out ultraviolet irradiation or heat treatment at the time of spin coating. Thus, an ultraviolet-curable resin material layer 104a comprising the first resin layer $104a_1$ and the second resin layer $104a_2$, is formed over the entire surface of the data substrate 111 (i.e. over the surface of the first reflective layer 103). Namely, on the first recording layer 102, the ultraviolet-curable resin material layer 104a is formed via the first reflective layer 103. And, by the above operation, it is possible to attain such a state that the stamper 110 having a concavo-convex shape for transfer, is placed on the ultraviolet-curable resin material layer 104a. In other words, it is such a state that the stamper 110 is placed on the surface of the ultraviolet-curable resin material layer 104a on the side opposite to the first recording layer 102.

In the step of curing the resin material layer, in the same manner as in the first embodiment, as shown in FIG. 3, ultraviolet radiation is applied from the stamper 110 side in this laminated state via the stamper 110 to cure the resin material layer 104a. Here, FIG. 3 is a schematic view to illustrate the step of curing the resin material layer in the process for producing an optical recording medium, to which the second embodiment of the present invention is applied. In FIG. 3, the same portions as in FIGS. 1(a) to (h) and FIGS. 2(a) and (b) are represented by the same symbols.

Also in the second embodiment of the present invention, like in the first embodiment, it is preferred to carry out curing up to a half-cured state without completing the curing of the ultraviolet-curable resin material layer 104a by ultraviolet radiation. It is particularly preferred to cure the second resin layer $104a_2$ as the outermost resin layer up to a half-cured state. By thus adjusting the curing of the ultraviolet-curble resin material layer 104a to curing up to a half-cured state, the adhesive force between the stamper 110 and the resin material layer 104a decreases, whereby separation of the stamper 110 which will be described hereinafter, can be facilitated. Further, by this method, it becomes possible to separate the stamper 110 satisfactorily even when a material which is usually difficult to separate, such as a polycarbonate resin, is used as the material for the stamper 110.

In order to adjust the curing of the ultraviolet-curable resin material layer 104a to curing up to a half-cured state, the conditions for the ultraviolet irradiation may be adjusted in the same manner as in the first embodiment.

As described in the foregoing, a bonded body 112' is obtained which comprises the data substrate 111, the ultraviolet-curable resin material layer 104a and the stamper 110. Here, in the bonded body 112' of this embodiment, each of the first resin layer $104a_1$ and the second resin layer $104a_2$ is described as in a half-cured state.

After thus curing the resin material layer 104a, in the same manner as in the first embodiment, the stamper 110 is separated from the curable resin layer 104a, whereby the concavo-convex shape for transfer of the stamper 110 is transferred to the ultraviolet-curable resin material layer 104a (see FIG. 1(d)).

Also in the second embodiment, after transferring the concavo-convex shape for transfer to the resin material layer 104a by separating the stamper 110, a surface modification treatment step of applying surface modification treatment to the resin material layer 104a is carried out (see FIG. 1(e)). Here, the method for the surface modification treatment may be carried out under the same conditions as in the above first embodiment. Thus, curing of both the layer portion of the first resin layer $104a_1$ and the layer portion of the second resin layer $104a_2$ sufficiently proceeds, and curing of the resin material layer 104a will be completed to obtain an interlayer 104.

Thus, also in the second embodiment, by applying the surface modification treatment to the resin material layer 104a after transferring the concavo-convex shape for transfer to the resin material layer 104a by separating the stamper 110, it is possible to accelerate the curing reaction of the resin material layer 104a to complete the curing thereby to form an interlayer 104. Thus, even when the data substrate 111 is held in a state where the stamper 110 is separated, the concavo-convex shape transferred to the interlayer 104 will no longer change, and it is possible to stabilize recording/retrieving of the second recording layer which will be described hereinafter.

Thereafter, the step of forming the second recording layer, the step of forming the second reflective layer and the step of forming the second substrate may, respectively be carried out in the same manner as in the first embodiment.

As described in the foregoing, like in the first embodiment, it is possible to produce an optical recording medium 100 provided with an interlayer 104 having a good concavo-convex shape and having little defects (see FIG. 1(g)). Further, according to the process for producing an optical recording medium of this embodiment, it is possible to obtain the same merits as in the first embodiment.

Further, in this embodiment, in order to form the interlayer 104, the ultraviolet-durable resin material layer 104a is constituted by a plurality of resin layers (the first resin layer $104a_1$ and the second resin layer $104a_2$). Thus, it is possible to obtain such merits that a material capable of readily improving the recording performance of the second recording layer 105 can be used as the outermost resin layer, a material having a good adhesion to the first reflective layer 103 can be used for the resin layer in contact with the data substrate 111, and a material capable of overcoming the warpage of the optical recording medium can be used for the resin layer in contact with the data substrate 111.

III. Description of Optical Recording Medium to which the Process for Prodding Optical Recording Medium of the Present Invention is Applicable The above first and second embodiments have been described with reference to a case of a dual layer type single side double-layered DVD-R having two recording layers containing an organic dye, as an example of the optical recording medium to be produced. However, the optical recording medium to which the process for producing an optical recording medium of the present invention can be applied, is by no means restricted to such an example. Namely, the present invention is applicable to any optical recording medium or laminate for optical recording medium which comprises a substrate, a recording layer and an interlayer having a concavo-convex shape and which is produced by a process comprising steps of forming a resin material layer on the recording layer directly or via another layer, placing a stamper having a concavo-convex shape for transfer on the resin material layer, curing the resin material layer and then separating the stamper from the resin material layer to transfer the concavo-convex shape for transfer of the stamper to the resin material layer to form an interlayer, whereby the effects of the present invention can satisfactorily be provided. Accordingly, the present invention is suitably applicable not only to recordable DVD-R, but also to playback-only DVD-ROM, rewritable DVD-RW or DVD-RAM, as well as HD DVD-ROM, HD DVD-R or HD DVD-RW which makes high density recording possible by means of a short wavelength blue laser. Further, the process of the present invention can be applied also to the production of a so-called film face incident type optical recording medium such as Blu-ray disk (such as BD-ROM, BD-R or BD-RE), in addition to the above-mentioned so-called substrate face incident type optical recording medium.

Further, the process for producing an optical recording medium of the present invention may be applied also to an optical recording medium having only one recording layer.

Further, the process for producing an optical recording medium of the present invention may be applied, for example, to an optical recording medium having at least three recording layers and at least two interlayers. In such a case, in order to form at least two interlayers respectively, the method for forming an interlayer as described in the above embodiments may be applied.

Further, as the optical recording medium to which the process for producing an optical recording medium of the present invention is applicable, a write once type recordable medium (write once medium such as CD-R or DVD-R) or a rewritable medium where recording and erasing can be repeatedly carried out (rewritable medium such as CD-RW or DVD-RW) is preferred, but a playback-only medium (ROM medium such as CD-ROM or DVD-ROM) is not excluded. It is particularly preferred to apply the process for producing an optical recording medium of the present invention to a recordable medium, whereby a stabilized recording/retrieving performance can be obtained.

Now, respective layers constituting a dual optical recording medium 100 will be described primarily with reference to a dual DVD-R as shown in FIG. 1(h).

First Substrate

The first substrate 101 is preferably excellent in optical characteristics such that it has optical transmittance, it has a small birefringence, etc. On the other hand, in the case of a film face incident type construction, there is no restriction with respect to the transparency or birefringence to the laser beam for recording/retrieving.

The material constituting the first substrate 101 is not particularly limited, and for example, a resin, metal or glass may be employed which has suitable processability and rigidity. The resin may, for example, be an acrylic resin, a methacrylic resin, a polycarbonate resin, a polyolefin resin (particularly non-crystalline polyolefin), a polyester resin, a polystyrene resin or an epoxy resin. Such materials constituting the first substrate 101 may be used alone or two or more of them may be used in an optional combination and ratio.

The thickness of the first substrate 101 is not particularly limited, but it is usually at most 2 mm, preferably at most 1.2 mm. When the distance between an objective lens and a recording layer is smaller and the substrate is thinner, coma aberration tends to be small, and the recording density tends to be high. However, the thickness is usually at least 10 µm, preferably at least 30 µm, in order to obtain sufficient optical characteristics, low moisture absorption properties, moldability and dimensional stability. Further, in a case where it is desired to secure the strength of the recording medium by the first substrate 101, the thickness is usually at least 0.5 mm.

The first substrate 101 preferably has low moisture absorption properties. Further, the first substrate 101 preferably has dimensional stability so that the optical recording medium has a certain rigidity.

On the first substrate 101, a guide groove for tracking is usually formed in a concavo-convex shape. The guide groove for tracking is usually provided as a concentric or spiral groove on the first substrate 101. The track-pitch of the guide groove varies depending upon the wavelength of the laser beam to be used for recording/retrieving of an optical recording medium. Specifically, in a CD-type optical recording medium, the track-pitch is usually at least 1.5 µm and at most 1.6 µm. In a DVD-type optical recording medium, the track-pitch is usually at least 0.7 µm and at most 0.8 µm. In a blue laser optical recording medium, the track-pitch is usually at least 0.1 µm and at most 0.6 µm.

On the other hand, the depth of the groove varies also depending upon the wavelength of the laser beam to be used for recording/retrieving of an optical recording medium. Specifically, in a CD-type optical recording medium, the groove depth is usually at least 10 nm and at most 300 nm, in a DVD-type optical recording medium, the groove depth is usually at least 10 nm and at most 250 nm. In a blue laser optical recording medium, the groove depth is usually at least 10 nm and at most 200 nm.

Further, in a case where a guide groove is to be formed on the surface of the first substrate 101, the method for forming the guide groove is optional. For example, it may be formed as follows. Specifically, in a case where metal or glass is used as the material for the first substrate 101, usually, a light-curable or heat-curable thin resin layer is formed on its surface, and a guide groove may be formed in such a resin layer. From such a viewpoint, it is preferred to use a resin as the material for the first substrate 101, since a guide groove may be formed on its surface by injection molding.

As the first substrate 101, a substrate of a ring shape having a center hole at the center is usually used. The ring shape is not particularly limited, and various shapes such as a disk shape, an elliptical shape and a polygonal shape are conceivable. However, the first substrate 101 is usually in a disk shape. In such a case, the diameter of the first substrate 101 is usually from 80 mm to 120 mm.

First Recording Layer

The first recording layer 102 usually preferably has a higher sensitivity as compared with a recording layer used in an optical recording medium to be used for CD-R, dual DVD-R, etc. For example, in an application to the above embodiments, in the optical recording medium 100, the first reflective layer 103 is usually made of a transparent reflective film. Therefore, a half of the applied laser beam 109 will pass through the first reflective layer 103. As a result, the power of the laser beam 109 entering in the first recording layer 102 reduces to a half. Thus, recording on the first recording layer 102 is carried out with a power corresponding to about one half of the applied laser beam, and therefore, it is desired that the first recording layer 102 has a particularly high sensitivity.

Further, the material to be used for the first recording layer 102 is not particularly limited, and it may be an organic substance or an inorganic substance. However, a compound having the maximum absorption wavelength λmax in a visible light to near infrared region of from about 350 to 900 nm and being suitable for recording by a blue to near microwave laser, is preferred. Usually, a compound suitable for recording by a near infrared laser with a wavelength of from about 770 to 830 nm to be used for CD-R, a compound suitable for recording by a red laser with a wavelength of from about 620 to 690 nm to be used for DVD-R, or a compound suitable for recording by a so-called blue laser with a wavelength of 410 nm or 515 nm, is, for example, more preferred.

A specific compound to be used for the first recording layer 102 is not particularly limited. For example, an organic dye material or an amorphous semiconductor may, for example, be mentioned, and it is particularly preferred to contain an organic dye material.

The organic dye material may, for example, be a macrocyclic azaanulene dye (such as phthalocyanine dye, naphthalocyanine dye or porphyrin dye), a pyrromethene dye, a polymethine dye (such as cyanine dye, merocyanine dye or squarilium dye), an anthraquinone dye, an azulenium dye, a metal-containing azo dye or a metal-containing indoaniline dye. Such dyes may be used alone or two or more of them may be used in an optional combination and ratio.

On the other hand, specific examples of the amorphous semiconductor material may, for example, be materials of SbTe type, GeTe type, GeSbTe type, InSbTe type, AgSbTe type, AgInSbTe type, GeSb type, GeSbSn type, InGeSbTe type and InGeSbSnTe type. Among them, it is preferred to employ a composition containing Sb as the main component, in order to increase the crystallizing speed. Such amorphous semiconductor materials may be used alone or two or more of them may be used in an optional combination and ratio.

Further, the thickness of the first recording layer 102 is not particularly limited, since the suitable film thickness varies depending upon e.g. the recording method. However, in order to obtain a sufficient modulation degree, it is usually at least 5 nm, preferably at least 10 nm, particularly preferably at least 20 nm. Further, in order to let light transmit, it is usually at most 3 µm, preferably at most 1 µm, more preferably at most 200 µm.

Further, the method for forming the first recording layer 102 is not particularly limited. However, usually, a thin film forming method commonly employed, such as a vacuum vapor deposition method, a sputtering method, a doctor blade method, a casting method, a spin coating method or a dipping method, may be mentioned. The film-forming method is preferably a wet system film-forming method such as a spin coating method is preferred from the viewpoint of the mass production and costs. Further, a vacuum deposition method is preferred from such a viewpoint that a uniform recording layer can be obtained.

First Reflective Layer

The first reflective layer 103 is desired to absorb a small amount of recording/retrieving light, to have a light transmittance of usually at least 40% and to have an appropriate light reflectance. As a specific construction example of the first reflective layer 103, a layer may be mentioned which has a proper transmittance imparted by thinly forming a metal having a high reflectance. Further, the first reflective layer 103 is desired to have a certain level of corrosion resistance. Further, it preferably has barrier properties such that the first recording layer 102 is not influenced by bleeding of another component from the upper layer (interlayer 104 in the above embodiments) of the first reflective layer 103.

Further, the material constituting the first reflective layer 103 is not particularly limited, and is preferably one having an appropriately high reflectance at a wavelength of retrieving light. As an example of the material constituting the first reflective layer 103, a metal or a metalloid such as Au, Al, Ag, Cu, Ti, Cr, Ni, Pt, Ta, Pd, Mg, Se, Hf, V, Nb, Ru, W, Mn, Re, Fe, Co, Rh, Ir, Zn, Cd, Ga, In, Si, Ge, Te, Pb, Po, Sn, Bi or a rare earth metal may be used alone or as an alloy. Further, the materials constituting the first reflective layer 103 may be used alone, or two or more of them may be used in an optional combination and ratio.

Further, the thickness of the first reflective layer 103 is usually at most 50 nm, preferably at most 30 nm, further preferably at most 20 nm. Within the above range, the light transmittance can be easily made to be at least 40%. However, the thickness of the first reflective layer 103 is usually at least 3 nm, preferably at least 5 nm, so that the first recording layer 102 is not influenced by a layer present on the first reflective layer 103.

Further, the method for forming the first reflective layer 103 is optional, and for example, a sputtering method, an ion plating method, a chemical vapor deposition method or a vacuum vapor deposition method may, for example, be mentioned.

Interlayer

The interlayer 104 is made of a resin which is transparent and capable of forming a concavo-convex shape for grooves or pits and which has a high adhesive force. Further, it is preferred to employ a resin having a small shrinkage ratio at the time of curing for adhesion, since the dimensional stability of the medium will be high.

Further, the interlayer 104 may be a single layer film as in the first embodiment or a multilayer film as in the second embodiment.

Further, the interlayer 104 is desired to be made of a material which presents no damage to the second recording layer 105. The material constituting the interlayer 104 may, for example, be a thermoplastic resin, or a curable resin such as a heat-curable resin or a radiation-curable resin. Further, such materials for the interlayer 104 may be used alone, or two or more of them may be used in an optional combination and ratio.

Among the materials for the interlayer 104, a radiation-curable resin is preferred, and among them, an ultraviolet-curable resin is preferred. By adopting such a resin, transfer of the concavo-convex shape of the stamper will be facilitated.

The ultraviolet-curable resin may be a radical (radical polymerizable) ultraviolet-curable resin and a cation (cation polymerizable) ultraviolet-curable resin, and either one may be used. As the radical ultraviolet-curable compound, a monofunctional (meth)acrylate and a polyfunctional (meth)acrylate may be used as polymerizable monomer components. These monomer components may be used alone or two or more of them may be used in an optional combination and ratio. Here, an acrylate and a methacrylate will generally be referred to as a (meth)acrylate.

Further, the photopolymerization initiator is not particularly limited, but, for example, a molecular cleavage type or a hydrogen abstraction type is preferred. In the present invention, it is preferred that an uncured ultraviolet-curable resin precursor composed mainly of a radical polymerizable acrylate is cured to obtain an interlayer.

On the other hand, the cationic ultraviolet-curable resin may, for example, be an epoxy resin containing a cation polymerizable photopolymerization initiator. The epoxy resin may, for example, be a bisphenol A-epichlorohydrin type, an alicyclic epoxy, a long chain aliphatic type, a brominated epoxy resin, a glycidyl ester type, a glycidyl ether type or a heterocyclic type. It is preferred to use as the epoxy resin one having small contents of free chlorine and chlorine ions. The amount of chlorine is preferably at most 1 wt %, more preferably at most 0.5 wt %.

Further, the cation polymerizable photoinitiator may, for example, be a sulfonium salt, an iodonium salt or a diazonium salt.

Further, in a case where a radiation-curable resin is used as the material for the interlayer 104, it is preferred to employ one which is liquid at a temperature of from 20 to 40° C. By using such a radiation-curable resin at the time of forming the resin material layer 104a, coating can be carried out without using a solvent, whereby the productivity will be improved. Further, it is preferred to adjust the viscosity to be from 20 to 4,000 mPa·s.

Further, on the interlayer 104, a concavo-convex shape is formed spirally or concentrically. And, such a concavo-convex shape constitutes a groove and a land. Usually, such a groove and/or land is used as a record track, information is recorded on or retrieved from the second recording layer 105. In the process for producing an optical recording medium of the present invention, it is possible to obtain an optical recording medium 100 having an interlayer 104 with little defects, since the process has a merit such that the above concavo-convex shape which is usually used as a record track can be satisfactorily formed.

Further, the width of the above groove is usually from about 50 to 800 nm, preferably from 100 to 600 nm, more preferably from 120 to 500 nm. The depth of the groove is usually from about 10 to 300 nm, preferably from 12 to 270 nm, more preferably from 14 to 250 nm. Further, in a case where the record track is spiral, the track pitch is usually from about 0.1 to 2.0 µm, preferably from 0.2 to 1.5 µm, more preferably from 0.3 to 1.0 µm.

Further, the thickness of the interlayer 104 is preferably accurately controlled, and it is usually at least 5 µm, preferably at least 10 µm. However, it is usually at most 100 µm, preferably at most 70 µm.

Further, the method for forming the interlayer 104 is optional without any particular restriction, but usually, the interlayer is formed as follows.

For the interlayer 104 employing a thermoplastic resin, a thermo-curable resin or the like, a coating liquid is prepared by dissolving the thermoplastic resin or the like in a suitable solvent. This coating liquid is applied and dried (heated) to form an interlayer 104.

On the other hand, for the interlayer 104 employing a radiation-curable resin, a coating liquid is prepared as it is or by dissolving it in a suitable solvent. The interlayer 104 employing such a radiation-curable resin may be formed by applying such a coating liquid and curing it by irradiation with a suitable radiation.

Here, the coating method is not particularly limited, and for example, a method such as a spin coating method or a casting method may be employed. Among them, a spin coating method is preferred. Particularly, an interlayer 104 employing a high viscosity resin may be applied and formed also by e.g. screen printing.

Second Recording Layer

The second recording layer 105 is, similar to the above-described first recording layer 102, usually desired to have a higher sensitivity than a recording layer used for an optical recording medium such as CD-R or dual DVD-R. Further, the second recording layer 105 is preferably made of a dye having a high refractive index with low heat generation so as to realize good recording/retrieving. Further, it is desired that by the combination of the second recording layer 105 and the second reflective layer 106, the reflection and absorption of light are adjusted within proper ranges.

The material constituting the second recording layer 105, its forming method, etc. may be the same for the first recording layer 102. However, the method of forming the second recording layer 105 is preferably a wet film formation method.

Further, the material to be used for the first recording layer 102 and for the second recording layer 105 may be the same or different.

A specific compound to be used for the second recording layer 105 is not particularly limited, and the same compound as for the first recording layer 102 may suitably be used.

Usually, as compared with a recording layer made of an amorphous semiconductor material, a recording layer made of an organic dye material has a deeper guide groove. Therefore, particularly in a case where the second recording layer 105 is made of a layer containing an organic dye material, it becomes difficult to form the second recording layer 105 while maintaining the deep groove shape formed in the interlayer 104. However, in the present invention, even when the second recording layer contains an organic dye material, its affinity with the interlayer 104 is good, whereby the concavo-convex shape formed on the interlayer 104 may be well reflected as the concavo-convex of the recording layer. Thus, according to the present invention, its effects are distinct particularly in a case where the second recording layer 105 contains an organic dye material.

The thickness of the second recording layer 105 is not particularly limited, since the suitable thickness varies depending upon e.g. the recording method, but it is usually at least 10 nm, preferably at least 30 nm, particularly preferably at least 50 nm. However, in order to obtain a proper reflectance, the thickness of the second recording layer 105 is usually at most 3 µm, preferably at most 1 µm, more preferably at most 200 nm.

Second Reflective Layer

The second reflective layer 106 is desired to have high reflectance and high durability.

The material constituting the second reflective layer 106 is preferably one having a sufficiently high reflectance at the wavelength of the retrieving light. As such a material constituting the second reflective layer 106, for example, a metal such as Au, Al, Ag, Cu, Ti, Cr, Ni, Pt, Ta or Pd may be used alone or as an alloy. Among them, Au, Al and Ag which have a high reflectance, are suitable as the material for the second reflective layer 106. Further, in addition to such a metal as the main component, another component may be contained. Such another component may, for example, be a metal or a metalloid such as Mg, Se, Hf, V, Nb, Ru, W, Mn, Re, Fe, Co, Rh, Ir, Cu, Zn, Cd, Ga, In, Si, Ge, Te, Pb, Po, Sn, Bi or a rare earth metal. Here, such materials constituting the second reflective layer 106 may be used alone, or two or more of them may be used in an optional combination and ratio.

Further, in order to secure the high reflectance, the thickness of the second reflective layer 106 is usually at least 20 nm, preferably at least 30 nm, further preferably at least 50 nm. However, in order to increase the recording sensitivity, it is usually at most 400 nm, preferably at most 300 nm.

Further, the method for forming the second reflective layer 106 is not particularly limited, and, for example, a sputtering method, an ion plating method, a chemical vapor deposition method or a vacuum deposition method may be mentioned.

Further, a known inorganic or organic interlayer or adhesive layer may be formed on or under the second reflective layer 106 for the purpose of improving the reflectance, improving recording characteristics, improving adhesion, etc.

Adhesive Layer

The adhesive layer 107 preferably has a high adhesive force and a small shrinkage ratio when it is cured for adhesion, whereby the dimensional stability of the optical recording medium 100 will be high. Further, the adhesive layer 107 is desired to be made of a material presenting no damage to the second reflective layer 106. Further, in order to suppress such a damage, a known inorganic or organic protective layer may be formed between the second reflective layer 106 and the adhesive layer 107.

The material of the adhesive layer 107 may be the same as the material of the interlayer 104.

Further, the thickness of the adhesive layer 107 is usually at least 2 µm, preferably at least 5 µm. However, in order to make the optical recording medium 100 as thin as possible, and in order to suppress e.g. deterioration of the productivity by requiring time for the curing, the thickness of the adhesive layer 107 is usually preferably at most 100 µm.

Further, as the adhesive layer 107, a pressure sensitive double coated adhesive tape or the like may also be used. The adhesive layer 107 can be formed by sandwiching the pressure sensitive double coated adhesive tape between the second reflective layer 106 and the second substrate 108, followed by pressing.

Second Substrate

The second substrate 108 preferably has high mechanical stability and has high rigidity. Further, it preferably has high adhesion with the adhesive layer 107.

As the material for such a second substrate 108, the same material as one which can be used for the first substrate 101 may be used. Further, as the above material, an Al alloy substrate of e.g. an Al—Mg alloy containing Al as the main component, a Mg alloy substrate of e.g. a Mg—Zn alloy containing Mg as the main component, a substrate made of one of silicon, titanium and ceramics, or a substrate comprising a combination thereof may, for example, be also used. Further, such materials for the second substrate 108 may be used alone, or two or more of them may be used in an optional combination and ratio.

Here, the material of the second substrate 108 is preferably a polycarbonate in view of high productivity such as moldability, costs, low moisture absorption properties, dimensional stability, etc. Further, the material of the second substrate 108 is preferably an amorphous polyolefin in view of chemical resistance, low moisture absorption properties, etc. Further, the material of the second substrate 108 is preferably a glass substrate in view of a high speed response property.

Further, in order to let the optical recording medium 100 have sufficient rigidity, the second substrate 108 is preferably thick to a certain extent, and the thickness of the second substrate 108 is preferably at least 0.3 mm. However, it is usually at most 3 mm, preferably at most 1.5 mm.

Other Layers

The optical recording medium 100 may have one or more optional other layers interposed in the above-described laminated structure, as the case requires. Otherwise, one or more optional other layers may be formed on the outermost surface of the optical recording medium 100. Further, the optical recording medium 100 may have a print-receiving layer on which writing (printing) is possible by a printer such as an inkjet printer or a thermal transfer printer or by any writing instrument, on the side which is not a side where the recording light or retrieving light enters, as the case requires. Further, two optical recording media may be bonded so that the first substrates 101 will face outside. By bonding two optical recording media 100, a large capacity medium having four recording layers can be obtained.

Further, the process for producing an optical recording medium of the present invention can be applied to a phase change type rewritable compact disk (CD-RW, CD-Rewritable) or a phase change type rewritable DVD. With respect to the layer structure of e.g. a recording layer to be applied to a phase change type optical recording medium, a conventional one may suitably be used. In the phase change type CD-RW or the rewritable DVD, detection of recording information signals is carried out by utilizing the difference in reflectance and the change in phase difference resulting from the difference in refractive index between the amorphous state and the crystalline state in the recording layer constituted by the phase-change type recording material. Specific examples of the phase change type recording material may, for example, be materials of e.g. SbTe type, GeTe type, GeSbTe type, InSbTe type, AgSbTe type, AgInSbTe type, GeSb type, GeSbSn type, InGeSbTe type, InGeSbSnTe type, etc. Among them, it is preferred to employ a composition containing Sb as the main component for the recording layer in order to improve the crystallization speed.

Further, the process for producing an optical recording medium of the present invention is applicable to a film face incident type optical recording medium such as a Blu-ray disk, as mentioned above. In such a case, the recording laser beam 109 is applied from the upper side of FIG. 1(h), whereby the order of lamination of the recording layer and the reflective layer is reversed, and a proper light reflectance is required for the second reflective layer i.e. not the first reflective layer. Further, a cover layer is formed instead of the second substrate.

For the cover layer, a material which is transparent to the recording laser beam and which has a little birefringence, is selected for use, and it is usually formed by bonding a cover layer sheet by an adhesive, or by applying a liquid material, followed by curing it with light, radiation or heat. The cover layer preferably has a transmittance of at least 70%, more preferably at least 80%, at the wavelength λ of the recording laser beam. Further, the upper limit of the transmittance is 100%. The cover layer may further have another layer with a thickness of at least 0.1 µm and at most 50 µm on its surface in order to impart such a function as scratch resistance or finger print resistance on its incident light side surface. The thickness of the cover layer is usually at least 0.01 mm, preferably at least 0.05 mm and usually at most 0.3 mm, preferably at most 0.15 mm, although it depends also on the wavelength λ of the recording laser beam or NA (numerical aperture) of the object lens. It is preferred to adjust so that the entire thickness including the thicknesses of the adhesive layer, hard coat layer, etc. will be within an optically acceptable thickness range. For example, in a so-called Blu-ray disk, it is preferably controlled to be at most about 100 µm±3 µm.

IV. Apparatus for Producing Optical Recording Medium of the Present Invention

Figure 4:
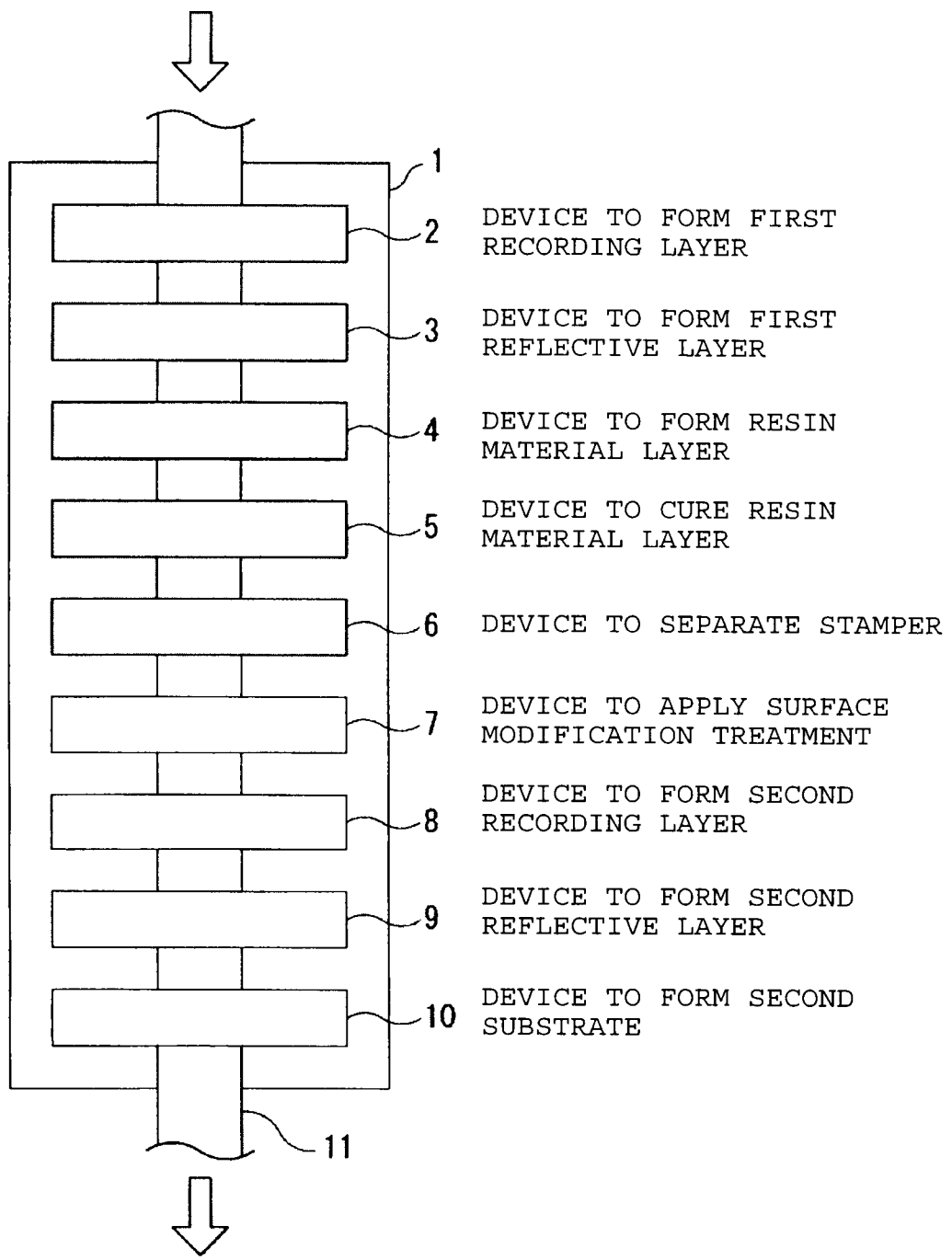
FIG. 4 is a block diagram of an apparatus for producing an optical recording medium of the present invention.

The method for producing an optical recording medium of such an embodiment may be carried out, for example, by an apparatus 1 for producing an optical recording medium, as shown in FIG. 4. Namely, this apparatus 1 comprises a device 2 to form a first recording layer, which carries out the operation of the step of forming a first recording layer, a device 3 to form a first reflective layer, which carries out the operation of the step of forming a first reflective layer, a device 4 to form a resin material layer, which carries out the operation of the step of forming a resin material layer, a device 5 to cure the resin material layer, which carries out the operation of the step of curing the resin material layer, a device 6 to separate a stamper, which carries out the operation of the step of separating a stamper, a device 7 to apply surface modification treatment, which carries out the step of applying surface modification treatment to the resin material layer, a device 8 to form a second recording layer, which carries out the operation of the step of forming a second recording layer, a device 9 to form a second reflective layer, which carries out the operation of the step of forming a second reflective layer, a device 10 to form a second substrate, which carries out the operation of the step of forming a second substrate, and a conveyer 11 to transport an intermediate product during the production between such devices 2 to 10 in the above-mentioned order.

Thus, this apparatus 1 is an apparatus for producing an optical recording medium comprising at least a substrate, a recording layer and an interlayer having a concavo-convex shape, and it comprises a first recording layer-forming device 2 as a means to form a first recording layer 102 on a first substrate 101 directly or via another layer, a resin material layer-forming device 4 as a means to form a resin material layer 104a on the first recording layer 102 directly or via another layer, a resin material layer-curing device 5 as a means to cure the resin material layer 104a in a state where a stamper 110 having a concavo-convex shape for transfer corresponding to the above concavo-convex shape, is placed on the resin material layer 104a thereby to obtain a bonded body 107 comprising the first substrate 101, the first recording layer 102, the resin material layer 104a and the stamper 110, a stamper-removing device 6 as a means to separate the stamper 110 from the bonded body 107 thereby to transfer the concavo-convex shape for transfer to the resin material layer 104a, and a surface modification treatment device 7 as a means to promote curing the resin material layer having the concavo-convex shape for transfer, transferred, thereby to apply the surface modification treatment. Accordingly, by carrying out the above-described process for producing an optical recording medium by this apparatus 1, it is possible to produce an optical recording medium provided with an interlayer having a good concavo-convex shape with little defects, at low cost, and in addition, it is possible to obtain the above-described functions and effects.

However, as mentioned above, the apparatus 1 shown here is an example of the apparatus to carry out the above-described process for producing an optical recording medium, and the apparatus for producing an optical recording medium of the present invention is not limited thereto and may be optionally changed within the range not to depart from the concept of the present invention. For example, devices 2 to 11 may be used in an optional combination depending upon the structure of an optical recording medium to be produced. Further, the apparatus 1 may be constituted by a combination with another apparatus. Devices 2 to 11 may be assembled into one apparatus 1 as in this example, or devices 2 to 11 which are separately constructed may be combined to constitute the apparatus 1 as a whole.

Further, one device may have functions of different devices in the apparatus 1. Such a case may, for example, be device 2 to form first recording layer and device 8 to form second recording layer, or device 3 to form first reflective layer and device 9 to form second reflective layer, or device 5 to cure resin material layer and device 7 to apply surface modification treatment.

Here, the above apparatus 1 is an example in a case where a substrate face incident type dual layer type single side double layered DVD-R is to be produced. Whereas, in the case of a film face incident type Blu-ray disk, the apparatus may be modified in such a manner that the order in placing the device to form a first recording layer and the device to form a first reflective layer, and the order in placing the device to form a second recording layer and the device to form a second reflective layer, are, respectively, reversed, and instead of the device to form a second substrate, a device to form a cover layer is installed.

Examples

Now, the present invention will be described in further detail with reference to Examples. However, it should be understood that the present invention is by no means restricted to the following Examples.

Example 1

Example of HD DVD-R-DL

This example is an example of HD DVD-R-DL (dual layer medium). However, in order to ascertain the effects of the present invention, by omitting a first recording layer and a first reflective layer, an optical recording medium was prepared and evaluated. It is possible to sufficiently ascertain by the following Example that the effects of the present invention are applicable to HD DVD-R-DL even when the first recording layer and the first reflective layer are omitted.

(1) Preparation of Optical Recording Medium
(1-1) Preparation of Stamper

Using a polycarbonate (PC) as the material, a disk-form stamper having a center hole with an inner diameter of 15 mm and having an outer diameter of 120 mm and a thickness of 0.60 mm (hereinafter sometimes referred to as PC1 stamper) was formed by an injection molding method. For the injection molding, a nickel master having a guide groove with a track pitch of 0.4 μm, a width of 0.23 μm and a depth of 65 nm, was used. By an atomic force microscope (AFM), it was confirmed that the guide groove (concaves and convexes) of the nickel master was accurately transferred to the PC1 stamper.

(1-2) Formation of First Substrate

Using the nickel stamper, a polycarbonate was injection-molded to obtain a substrate (first substrate) having a groove formed with a track pitch of 0.4 μm, a width of 0.23 μm and a depth of 60 nm, and having a diameter of 120 mm and a thickness of 0.58 mm.

(1-3) Formation of Interlayer

Then, on the first substrate, a ultraviolet-curable resin (SD6036 manufactured by Dainippon Ink and Chemicals) to form a first resin layer, was dropped in a circular form, and a film having a thickness of about 18 μm (the first resin layer) was formed by a spinner method. On the other hand, on the side of the PC1 stamper having a guide groove formed, a prescribed ultraviolet-curable resin (MPZ388, manufactured by Nippon Kayaku Co., Ltd.) to form a second resin layer (the outermost resin layer) was dropped in a circular form, and a film (the second resin film) having a thickness of about 7 μm was formed by a spinner method.

Then, the first substrate and the PC1 stamper were bonded so that the first resin layer and the second resin layer face each other. Then, from the PC1 stamper side, ultraviolet radiation was applied in atmospheric air at room temperature (light source: TOSCURE 751, manufactured by HARISON TOSHIBA LIGHTING CORPORATION) to cure the first resin layer and the second resin layer thereby to form a bonded body. The dose of ultraviolet radiation at that time was 90 mJ/cm$^2$.

After forming the bonded body, a knife edge was inserted to the peripheral portion of the bonded body, and a force was exerted to separate the PC1 stamper from the second resin layer (the outermost resin layer). At the interface between the PC1 stamper and the second resin layer (the outermost resin layer), separation was carried out in an excellent state without non-uniformity over the entire surface. Further, after removing the PC1 stamper, the surface of the second resin layer (the outermost resin layer) was touched with a finger, whereby stickiness was felt, and thus a half-cured state was confirmed.

After removing the PC1 stamper, ultraviolet radiation was immediately applied on the second resin layer to carry out surface modification treatment thereby to form an interlayer. The dose of ultraviolet radiation at that time was 350 mJ/cm$^2$.

(1-4) Formation of Second Recording Layer, Etc.

One having the interlayer formed on the first substrate and having the surface modification treatment applied, was left to stand for 12 hours in a clean booth at 25° C. under a relative humidity of 42%, and then, on the interlayer, a tetrafluoropropanol solution of a metal containing azo dye (concentration: 1.0 wt %) was dropped and applied by a spinner method. After the coating, drying was carried out at 70° C. for 30 minutes to form a second recording layer. Here, for this second recording layer, the coating conditions were adjusted so that the OD value with a laser having a wavelength of 470 nm would be 0.15.

Then, on the second recording layer, a second reflective layer having a thickness of 100 nm was formed by a sputtering method by using an Ag alloy made of Ag—Bi (Bi: 1.0 at %).

Further, on the second reflective layer, an ultraviolet-curable resin was spin-coated to form an adhesive layer. And, on this adhesive layer, a polycarbonate substrate having a diameter of 120 mm and a thickness of 0.6 mm was placed as a second substrate, followed by irradiation with ultraviolet radiation for curing and bonding.

In this manner, an optical recording medium was produced.

(2) Measurement of Push-Pull Signal of Optical Recording Medium

A push-pull signal from the optical recording medium produced by the above process was measured. The larger the numerical value, the better the recording characteristics. Here, the push-pull signal is defined by the following formula:

$$(\text{Push-Pull}) = \frac{(I_1 - I_2)_{PP}}{|(I_1 + I_2)_{max} + (I_1 + I_2)_{min}|/2}$$

In the formula, $(I_1-I_2)_{pp}$ is the peak-to-peak amplitude of the $(I_1-I_2)$ signal. $(I_1+I_2)_{max}$ is the maximum value of the $(I_1+I_2)$ signal. $(I_1+I_2)_{min}$ is the minimum value of the $(I_1+I_2)$ signal. Here, $(I_1)$ is the sum of outputs of PD1 and PD2 ($I_1$=PD1+PD2) located on the left side of the virtual center of a guide groove when the retrieving signal from the optical recording medium is received as tetrameric detectors (PD1, PD2, PD3 and PD4) by means of a tetrameric photodetector. $(I_2)$ is the sum of outputs of PD3 and PD4 ($I_2$=PD3+PD4) located on the right side of the virtual center of the guide groove.

Here, a focus servo was applied to the second recording layer, and a tracking servo was in an open loop state, whereby an optical recording medium was rotated at 600 rpm. Usually, there is an eccentricity of a few dozen micrometer on an optical disk, and the retrieving beam will get across a guide groove and a land a few dozen times by one rotation. The ($I_1-I_2$) signal and ($I_1+I_2$) signal show a sinusoidal output.

The push-pull signal was measured by using OCU1000 manufactured by Pulstec Industrial Co., Ltd. with a retrieving power of 0.4 mW by using a laser beam with a wavelength of 405 nm. The results of measurement of the push-pull signal as measured at a radial position of 40 mm on the optical recording medium is shown in Table 1.

Example 2 and 3 and Comparative Example 1 and 2

An optical recording medium was prepared in the same manner as in Example 1 except that the ultraviolet irradiation dose at the time of forming the bonded body and the ultraviolet irradiation dose at the time of the surface modification treatment were as shown in Table 1. Here, in the production of each medium, when the surface of the second resin layer (the outermost resin layer) was touched with a finger after separating the PC1 stamper, stickiness was felt, and thus it was found to be in a half-cured state.

With respect to the obtained optical recording media, measurement of the push-pull signal was carried out in the same manner as in Example 1. The results are shown in Table 1.

Examples 4 to 6 and Comparative Examples 3 and 4

A stamper (which may be referred to as the APO1 stamper) was prepared in the same manner as in Example 1 by using an amorphous polyolefin, instead of the PC1 stamper. An optical recording medium was prepared in the same manner as in Example 1 except that this APO1 stamper was used, and the ultraviolet irradiation dose at the time of forming the bonded body and the ultraviolet irradiation dose at the time of surface modification treatment were as shown in Table 1. Here, in the production of each medium, when the surface of the second resin layer (the outermost resin layer) was touched with a finger after separating the APO1 stamper, stickiness was felt, and thus, it was confirmed to be in a half-cured state.

With respect to the obtained optical recording media, measurement of the push-pull signal was carried out in the same manner as in Example 1. The results are shown in Table 1.

TABLE 1

| | Stamper | Ultraviolet irradiation dose at the time of forming bonded body (mJ/cm$^2$) | Ultraviolet irradiation dose during surface modification treatment (mJ/cm$^2$) | Push-pull signal |
|---|---|---|---|---|
| Ex. 1 | PC1 | 90 | 350 | 0.38 |
| Ex. 2 | PC1 | 200 | 200 | 0.33 |
| Ex. 3 | PC1 | 200 | 350 | 0.35 |
| Comp. Ex. 1 | PC1 | 90 | No irradiation | 0.29 |
| Comp. Ex. 2 | PC1 | 200 | No irradiation | 0.30 |
| Ex. 4 | APO1 | 50 | 350 | 0.44 |
| Ex. 5 | APO1 | 200 | 200 | 0.41 |
| Ex. 6 | APO1 | 200 | 350 | 0.43 |
| Comp. Ex. 3 | APO1 | 50 | No irradiation | 0.28 |
| Comp. Ex. 4 | APO1 | 200 | No irradiation | 0.37 |

As shown in Table 1, in Examples 1 to 3 and Examples 4 to 6 wherein surface modification treatment was carried out, the values of the push-pull signal are larger than in Comparative Examples 1 and 2 and Comparative Examples 3 and 4, respectively, wherein no surface modification treatment was carried out. This indicates a possibility that in Comparative Examples 1 to 4, the guide groove shape of the second recording layer is changed from the groove shape of the stamper (PC1 or APO1). Whereas, it is evident that in Examples 1 to 6, a second recording layer having a good concavo-convex shape is formed by suppressing such a change.

This indicates that according to the process of the present invention, it is possible to obtain an optical recording medium having recording/retrieving of information by light stabilized.

Example 7

Example for DVDR-DL (120 mm Medium)

(3) Preparation of Optical Recording Medium
(3-1) Preparation of Stamper

Using a polycarbonate (PC) as the material, a disk-form stamper (hereinafter sometimes referred to as the PC2 stamper) having a center hole with an inner diameter of 15 mm and having an outer diameter of 120 mm and a thickness of 0.60 mm was formed by an injection molding method. For the injection molding, a nickel master having a guide groove with a track pitch of 0.74 μm, a width of 0.32 μm and a depth of 175 nm, was used. Here, by an atomic force microscope, it was confirmed that the guide groove (concaves and convexes) of the nickel master was accurately transferred to the PC2 stamper.

(3-2) Formation of First Recording Layer, Etc.

Using the nickel stamper, a polycarbonate was injection-molded to obtain a substrate (first substrate) having a diameter of 120 mm and a thickness of 0.57 mm and having a groove with a track pitch of 0.74 μm, a width of 0.33 μm and a depth of 160 nm formed.

Then, a tetrapropanol solution of a metal-containing azo dye (concentration: 0.9 wt %) was prepared, and this solution was dropped on a substrate and applied by a spinner method. After the application, it was dried at 70° C. for 30 minutes to form a first recording layer. Here, for the first recording layer, the coating conditions were adjusted so that the OD value would be 0.53 with a laser having a wavelength of 590 nm.

Further, on the first recording layer, a translucent first reflective layer having a thickness of 17 nm was formed by a sputtering method by using an Ag alloy made of Ag—Bi (Bi: 1.0 at %).

(3-3) Formation of Interlayer

Then, on the first reflective layer, an ultraviolet-curable resin (SD6036, manufactured by Dainippon Ink and Chemicals) to form a first resin layer, was dropped in a circular form, and a film having a thickness of about 35 μm (first resin layer) was formed by a spinner method. On the other hand, on the surface of the PC stamper having a guide groove formed, a prescribed ultraviolet-curable resin (MPZ388, manufactured by Nippon Kayaku Co., Ltd.) to form a second resin layer (the outermost layer) was dropped in a circular form, and a film having a thickness of about 13 μm (second resin layer) was formed by a spinner method.

Then, the first substrate and the PC2 stamper were bonded so that the first resin layer and the second resin layer faced each other. Then, ultraviolet radiation was applied at room temperature from the PC2 stamper side to cure the first resin layer and the second resin layer thereby to form a bonded body. The irradiation dose of the ultraviolet radiation at that time was 200 mJ/cm².

After separating the PC2 stamper in the same manner as in Example 1, ultraviolet radiation was immediately applied on the second resin layer to carry out surface modification treatment thereby to form an interlayer. The irradiation dose of the ultraviolet radiation at that time was 350 mJ/cm². Here, when the surface of the second resin layer (the outermost resin layer) was touched with a finger after separating the PC2 stamper, stickiness was felt, and thus, it was confirmed to be in a half-cured state.

(3-4) Formation of Second Recording Layer, Etc.

One having the first recording layer, the first reflective layer and the interlayer formed on the substrate and having the surface modification treatment applied, was left to stand for 12 hours in a clean booth at 25° C. under relative humidity of 42%, and then, on the interlayer, a tetrafluoropropanol solution of a metal-containing azo dye (concentration: 1.1 wt %) was dropped and applied by a spinner method. After the application, it was dried at 70° C. for 30 minutes to form a second recording layer. Here, for the second recording layer, the coating conditions were adjusted so that the OD value would be 0.59 with a laser having a wavelength of 590 nm.

Then, on the second recording layer, a second reflective layer having a thickness of 120 nm was formed by a sputtering method by using an Ag alloy made of Ag—Bi (Bi: 1.0 at %).

Further, on the second reflective layer, an ultraviolet-curable resin was spin-coated to form an adhesive layer. Then, on this adhesive layer, a polycarbonate substrate having a diameter of 120 mm and a thickness of 0.6 mm was placed as a second substrate, and cured and bonded by applying ultraviolet radiation.

Thus, a multilayer type optical recording medium having two recording layers, was produced.

(4) Measurement of Push-Pull Signal of Optical Recording Medium

The push-pull signal obtainable from the second recording layer of the optical recording medium produced by the above process was measured. The larger the numerical value, the better the recording characteristics. Here, the push-pull signal was measured by using ODU1000 manufactured by Pulstec Industrial Co., Ltd. with a retrieving power of 0.7 mW by using a laser beam having a wavelength of 650 nm. The results of measurement of push-pull signals measured respectively at radial positions of 23 mm, 40 mm and 58 mm on the optical recording medium, are shown in Table 2.

(5) Measurement of Groove Shape of Recording Layer

With respect to the optical recording medium produced by the above process, the groove depth and groove width of the guide groove before and after the formation of the second recording layer were, respectively, measured at radial positions of 25 mm, 40 mm and 55 mm. For the measurement, UMDS argus plus manufactured by dr. schwab was used. Before formation of the second recording layer, the surface of the interlayer after the surface modification treatment was measured. After the formation of the second recording layer, after further forming the second reflective layer, the surface of the second reflective layer was measured. The results are shown in Table 3.

Examples 8 and 9 and Comparative Examples 5 and 6

A multilayer type optical recording medium having two recording layers, was produced in the same manner as in Example 7 except that the ultraviolet irradiation dose at the time of forming the bonded body and the ultraviolet irradiation dose at the time of the surface modification treatment were as shown in Table 2. Here, in the production of each medium, when the surface of the second resin layer (the outermost layer) was felt with a finger after separating the PC2 stamper, stickiness was felt, and thus, it was confirmed to be in a half-cured state.

The obtained optical recording medium was subjected to the measurement of the push-pull signal in the same method as in Example 7. The results are shown in Table 2. Here, with respect to Comparative Example 5, the results of the measurement of the guide groove shape before and after the formation of the second recording layer carried out in the same method as in Example 7, are shown in Table 3.

Examples 10 and 11 and Comparative Examples 7 and 8

A stamper (which may be referred to as the APO2 stamper) was produced in the same manner as in Example 7 by using an amorphous polyolefin, instead of the PC2 stamper. A multilayer type optical recording medium having two recording layers, was produced in the same manner as in Example 7 except that the APO2 stamper was used, and the ultraviolet irradiation dose at the time of forming the bonded body and the ultraviolet irradiation dose at the time of the surface modification treatment were as shown in Table 2. Here, in the production of each medium, when the surface of the second resin layer (the outermost layer) was touched with a finger after separating the APO2 stamper, stickiness was felt, and thus, it was confirmed to be in a half-cured state.

The obtained optical recording medium was subjected to the measurement of the push-pull signal by the same method as in Example 7. The results are shown in Table 2.

TABLE 2

| | Stamper | Ultraviolet irradiation dose at the time of forming bonded body (mJ/cm²) | Ultraviolet irradiation dose during surface modification treatment (mJ/cm²) | Push-pull signal (measured positions) | | |
|---|---|---|---|---|---|---|
| | | | | 23 mm | 40 mm | 58 mm |
| Ex. 7 | PC2 | 200 | 350 | 0.38 | 0.37 | 0.32 |
| Ex. 8 | PC2 | 50 | 350 | 0.39 | 0.38 | 0.33 |
| Ex. 9 | PC2 | 50 | 600 | 0.43 | 0.41 | 0.36 |
| Comp. Ex. 5 | PC2 | 200 | No irradiation | 0.09 | 0.11 | 0.08 |
| Comp. Ex. 6 | PC2 | 50 | No irradiation | 0.16 | 0.17 | 0.13 |
| Ex. 10 | APO2 | 50 | 350 | 0.44 | 0.43 | 0.38 |
| Ex. 11 | APO2 | 200 | 350 | 0.47 | 0.46 | 0.42 |
| Comp. Ex. 7 | APO2 | 50 | No irradiation | 0.25 | 0.25 | 0.22 |
| Comp. Ex. 8 | APO2 | 200 | No irradiation | 0.39 | 0.40 | 0.36 |

TABLE 3

| Step | | Groove depth (nm) | | | Groove width (nm) | | |
|---|---|---|---|---|---|---|---|
| | | 25 mm | 40 mm | 55 mm | 25 mm | 40 mm | 55 mm |
| Before formation of second recording layer | Ex. 7 | 140 | 148 | 149 | 330 | 330 | 329 |
| | Comp. Ex. 5 | 141 | 148 | 150 | 330 | 329 | 328 |

TABLE 3-continued

| Step | | Groove depth (nm) | | | Groove width (nm) | | |
|---|---|---|---|---|---|---|---|
| | | 25 mm | 40 mm | 55 mm | 25 mm | 40 mm | 55 mm |
| After formation of second recording layer | Ex. 7 | 90 | 94 | 93 | 259 | 246 | 254 |
| | Comp. Ex. 5 | 75 | 77 | 76 | 283 | 277 | 280 |

As shown in Table 2, in Examples 7 to 9 and Examples 10 and 11 wherein surface modification treatment was carried out, the values of the push-pull signal are larger than Comparative Examples 5 and 6 and Comparative Examples 7 and 8, respectively, wherein no surface modification treatment was carried out, at each measured position. This indicates a possibility that in Comparative Examples 5 to 8, the guide groove shape of the second recording layer is changed from the groove shape of the stamper (PC2 or APO2). Whereas, it is evident that in Examples 7 to 11, a second recording layer having a good concavo-convex shape is formed by suppressing such a change.

Further, from Table 3, it was confirmed that in Example 7 wherein surface modification treatment was carried out, the groove after the formation of the second recording layer is deeper than in Comparative Example 5 wherein no surface modification treatment was carried out. This supports that results of the push-pull signal shown in Table 2, and it is evident that in Example 7, a second recording layer having a good concavo-convex shape was formed. In Table 3, no difference in the groove shape in Example 7 and Comparative Example 5 is observed before the formation of the second recording layer, and it is considered that by the surface modification treatment, the affinity between the interlayer and the second recording layer, i.e. the wettability, was changed and as a result, the concavo-convex shape reflecting the guide groove of the stamper was formed in the second recording layer. In a case where no surface modification treatment was carried out, it is considered that the guide groove formed in the interlayer is embedded in the process of forming the second recording layer.

Thus, it was confirmed that according to the process of the present invention, it is possible to obtain an optical recording medium having recording/retrieving of information by light stabilized.

Example 12

Example OF DVDR-DL (80 mm Medium)

(6) Preparation of Optical Recording Medium (6-1) Preparation of Stamper

Using an amorphous polyolefin as the material, a disk-form stamper (hereinafter sometimes referred to as the APO3 stamper) having an outer diameter of 80 mm and a thickness of 0.60 mm and having a center hole with an inner diameter of 15 mm, was formed by an injection molding method. For the injection molding, a nickel master having a guide groove with a track pitch of 0.74 µm, a width of 0.32 µm and a depth of 175 nm, was used. Here, by the atomic force microscope, it was confirmed that the guide groove (concaves and convexes) of the nickel master was accurately transferred to the APO3 stamper.

(6-2) Formation of First Recording Layer, Etc.

Using the nickel stamper, a polycarbonate was injection-molded to form a substrate (first substrate) having a diameter of 80 mm and a thickness of 0.57 mm and having a groove formed with a track pitch of 0.74 µm, a width of 0.33 mm and a depth of 160 nm.

Then, a tetrafluoropropanol solution of a metal-containing azo dye (concentration: 0.9 wt %) was prepared, and this solution was dropped on a substrate and applied by a spinner method. After the application, it was dried at 70° C. for 30 minutes to form a first recording layer. Here, for the first recording layer, the coating conditions were adjusted so that the OD value would be 0.53 with a laser having a wavelength of 590 nm.

Further, on the first recording layer, a translucent first reflective layer having a thickness of 17 nm was formed by a sputtering method by using an Ag alloy made of Ag—Bi (Bi: 1.0 at %).

(6-3) Formation of Interlayer

Then, on the first reflective layer, an ultraviolet-curable resin (SD6036 manufactured by Dainippon Ink and Chemicals) to form a first resin layer, was dropped in a circular form, and a film having a thickness of about 35 µm (the first resin layer) was formed by a spinner method. On the other hand, on the surface of the APO3 stamper having a guide groove formed, a prescribed ultraviolet-curable resin (MPZ388 manufactured by Nippon Kayaku Co., Ltd.) to form a second resin layer (the outermost resin layer) was dropped in a circular form, and a film having a thickness of about 13 µm (the second resin layer) was formed by a spinner method.

Then, the first substrate and the APO3 stamper were bonded so that the first resin layer and the second resin layer faced each other. Then, from the APO3 stamper side, ultraviolet radiation was applied at room temperature to cure the first resin layer and the second resin layer thereby to form a bonded body. The irradiation dose of ultraviolet radiation at that time was 100 mJ/cm$^2$.

After separating the APO3 stamper in the same manner as in Example 1, ultraviolet radiation was immediately applied on the second resin layer for surface modification treatment to form an interlayer. The irradiation dose of ultraviolet radiation at that time was 400 mJ/cm$^2$. Here, when the surface of the second resin layer (the outermost resin layer) was touched with a finger after separating the APO3 stamper, stickiness was felt, and thus it was confirmed to be in a half-cured state.

(6-4) Formation of Second Recording Layer, Etc.

One having the first recording layer, the first reflective layer and the interlayer formed on the substrate and having the surface modification treatment applied, was placed in a clean booth at 25° C. under a relative humidity of 42%, and then, immediately, on the interlayer, a tetrafluoropropanol solution of a metal-containing azo dye (concentration: 1.1 wt %) was dropped and applied by a spinner method. After the application, it was dried at 70° C. for 30 minutes to form a second recording layer. Here, for the second recording layer, the coating conditions were adjusted so that the OD value would be 0.59 with a laser having a wavelength of 590 nm.

Then, on the second recording layer, a second reflective layer having a thickness of 120 nm was formed by a sputtering method by using an Ag alloy made of Ag—Bi (Bi: 1.0 at %).

Further, on the second reflective layer, an ultraviolet-curable resin was spin-coated to form an adhesive layer. And, on this adhesive layer, a polycarbonate substrate having a diameter of 80 mm and a thickness of 0.6 mm was placed as a second substrate and cured and bonded by irradiation with ultraviolet radiation.

Thus, a multilayer type optical recording medium having two recording layers, was produced.

(7) Measurement of Push-Pull Signal of Optical Recording Medium

The push-pull signal obtained from the second recording layer of the optical recording medium produced by the above process was measured. The larger the numerical value, the better the recording characteristics.

The push-pull signal was measured by using ODU1000, manufactured by Pulstec Industrial Co., Ltd. with a retrieving power of 0.7 mW by using a laser beam having a wavelength of 650 nm. The results of measurement of the push-pull signals as measured at radial positions of 23 mm, 33 mm and 38 mm, respectively, on the optical recording medium, are shown in Table 4.

(8) Confirmation of Separation Defects of Optical Recording Medium

With respect to the optical recording medium produced by the above process, the presence or absence of the groove missing likely to occur in the peripheral direction, or the separation defects likely to occur in a radial direction, was observed by an optical microscope.

Examples 13 to 15 and Comparative Examples 9 to 12

A multilayer type optical recording medium having two recording layers was produced in the same manner as in Example 12 except that the ultraviolet irradiation dose at the time of forming the bonded body and the ultraviolet irradiation dose at the time of the surface modification treatment were as shown in Table 4. Here, in the production in Examples 13 and 14 and Comparative Examples 9 to 11, when the surface of the second resin layer (the outermost resin layer) was touched with a finger after separating the APO3 stamper, stickiness was felt, and thus, it was confirmed to be a half-cured state. In the production in Comparative Example 15 and Comparative Example 12, when the surface of the second resin layer (the outermost resin layer) was touched with a finger after separating the APO3 stamper, no substantial stickiness was felt.

With respect to the obtained optical recording media, the measurement of the push-pull signal and confirmation of the separation defects were carried out in the same manner as in Example 12. The results are shown in Table 4.

As shown in Table 4, in Examples 12 to 15 wherein surface modification treatment was carried out, the value of push-pull signal is larger than in Comparative Examples 9 to 12 wherein no surface modification treatment was carried out, at any measured position. This indicates a possibility that in Comparative Examples 9 to 12, the guide groove shape of the second recording layer is changed from the groove shape of the stamper (APO3). Whereas, in Example 12 to 15, it is evident that the second recording layer having a good concavo-convex shape is formed by suppressing such a change.

Thus, it is considered that according to the process of the present invention, it is possible to obtain an optical recording medium having recording/retrieving of information by light stabilized.

Further, in Example 15 and Comparative Example 12 wherein a large amount of ultraviolet radiation was applied at the time of forming the bonded body, groove missing/separation defect were observed. Whereas, in Examples 12 to 14 and Comparative Examples 10 and 11, no groove missing/no separation defects were observed. Thus, it was confirmed that in order to form a good guide groove (i.e. a concavo-convex shape), it is preferred to bring the interlayer (the resin material layer) to a half-cured state before separating the stamper.

Example 16

Example of DVDR-DL (120 mm Medium)

(9) Preparation of Optical Recording Medium
(9-1) Preparation of Stamper

As the stamper, the same stamper as the PC2 stamper used in Example 7 was used. This stamper will be optionally referred to as the PC3 stamper.

(9-2) Formation of First Recording Layer, Etc.

By using the nickel stamper, a polycarbonate was injection-molded to form a substrate (first substrate) having a diameter of 120 mm and a thickness of 0.57 mm and having a groove formed with a track pitch of 0.74 µm, a width of 0.33 µm and a depth of 160 nm.

Then, a tetrafluoropentanol solution of a metal-containing azo dye (concentration: 0.9 wt %) was prepared, and this solution was dropped on a substrate and applied by a spinner method. After the application, it was dried at 70° C. for 30 minutes to form a first recording layer. Here, for the first

TABLE 4

| | Stamper | Ultraviolet irradiation dose at the time of forming bonded body (mJ/cm²) | Ultraviolet irradiation dose during surface modification treatment (mJ/cm²) | Push-pull signal (measured positions) | | | Groove missing/ Separation defects |
|---|---|---|---|---|---|---|---|
| | | | | 23 mm | 33 mm | 38 mm | |
| Ex. 12 | APO3 | 100 | 400 | 0.41 | 0.40 | 0.35 | Nil |
| Ex. 13 | APO3 | 140 | 400 | 0.43 | 0.42 | 0.38 | Nil |
| Ex. 14 | APO3 | 180 | 400 | 0.43 | 0.42 | 0.37 | Nil |
| Ex. 15 | APO3 | 240 | 400 | 0.43 | 0.42 | 0.37 | Observed |
| Comp. Ex. 9 | APO3 | 100 | No irradiation | 0.28 | 0.32 | 0.28 | Nil |
| Comp. Ex. 10 | APO3 | 140 | No irradiation | 0.33 | 0.35 | 0.32 | Nil |
| Comp. Ex. 11 | APO3 | 180 | No irradiation | 0.36 | 0.37 | 0.33 | Nil |
| Comp. Ex. 12 | APO3 | 240 | No irradiation | 0.37 | 0.38 | 0.33 | Observed | recording layer, the coating conditions were adjusted so that the OD value would be 0.53 with a laser having a wavelength of 590 nm.

Further, on the first recording layer, a translucent first reflective layer having a thickness of 17 nm was formed by a sputtering method by using an Ag alloy made of Ag—Bi (Bi: 1.0 at %).

(9-3) Formation of Interlayer

Then, on the reflective layer, an ultraviolet-curable resin (SD6036 manufactured by Dainippon Ink and Chemicals) to form a first resin layer, was dropped in a circular form, and a film having a thickness of about 35 μm (the first resin layer) was formed by a spinner method. On the other hand, on the surface of the PC3 stamper having a guide groove formed, a prescribed ultraviolet-curable resin (MPZ388 manufactured by Nippon Kayaku Co., Ltd.) to form a second resin layer (the outermost resin layer) was dropped in a circular form, and the film having a thickness of 13 μm (the second resin layer) was formed by a spinner method.

Then, the first substrate and the PC3 stamper were bonded so that the first resin layer and the second resin layer faced each other. Then, from the PC3 stamper side, ultraviolet radiation was applied at room temperature to cure the first resin layer and the second resin layer thereby to form a bonded body. The irradiation dose of ultraviolet radiation at that time was 240 mJ/cm$^2$.

After separating the PC3 stamper in the same manner as in Example 1, surface modification treatment by heat treatment at 100° C. for 30 minutes was immediately carried out to form an interlayer. Here, when the surface of the second resin layer (the outermost resin layer) was touched with a finger after separating the PC3 stamper, no substantial stickiness was felt.

(9-4) Formation of Second Recording Layer, Etc.

One having the first recording layer, the first reflective layer and the interlayer formed on the substrate and having the surface modification treatment applied, was left to stand for 12 hours in a clean booth at 25° C. under a relative humidity of 42%, and then, on the interlayer, a tetrafluoropropanol solution of a metal-containing azo dye (concentration: 1.1 wt %) was dropped and applied by a spinner method. After the application, it was dried at 70° C. for 30 minutes to form a second recording layer. Here, for the second recording layer, the coating conditions were adjusted so that the OD value would be 0.59 with a laser having a wavelength of 590 nm.

Then, on the second recording layer, a second reflective layer having a thickness of 120 nm was formed by a sputtering method by using an Ag alloy made of Ag—Bi (Bi: 1.0 at %).

Further, on the second reflective layer, an ultraviolet-curable resin was spin-coated to form an adhesive layer. And, on this adhesive layer, a polycarbonate substrate having a diameter of 120 mm and a thickness of 0.6 mm was placed as a second substrate and cured and bonded by irradiation with ultraviolet radiation.

Thus, a multilayer type optical recording medium having two recording layers, was produced.

(10) Measurement of Push-Pull Signal of Optical Recording Medium

The push-pull signal obtainable from the second recording layer of the optical recording medium produced by the above process was measured. The larger the numerical value, the better the recording characteristics.

The push-pull signal was measured by using ODU1000 manufactured by Pulstec Industrial Co., Ltd. with a retrieving power of 0.7 mW by using a laser beam having a wavelength of 650 nm. The results of measurement of the push-pull signals measured at radial positions of 23 mm, 40 mm and 58 mm, respectively, on the optical recording medium, are shown in Table 5.

Example 17 and Comparative Example 13

A multilayer type optical recording medium having two recording layers was produced in the same manner as in Example 16 except that the ultraviolet irradiation dose at the time of forming the bonded body and the heating treatment conditions at the time of the surface modification treatment were as shown in Table 5. Here, when the surface of the second resin layer (the outermost resin layer) was touched with a finger after separating the PC3 stamper, no substantial stickiness was felt in each case.

The obtained optical recording medium was subjected to measurement of the push-pull signal in the same manner as in Example 16. The results are shown in Table 5.

TABLE 5

| | Stamper | Ultraviolet irradiation dose at the time of forming bonded body (mJ/cm$^2$) | Heat treatment conditions | Push-pull signal (measured positions) | | |
|---|---|---|---|---|---|---|
| | | | | 23 mm | 40 mm | 58 mm |
| Ex. 16 | PC3 | 240 | 100° C., 10 min. | 0.30 | 0.30 | 0.27 |
| Ex. 17 | PC3 | 240 | 100° C., 30 min. | 0.32 | 0.31 | 0.28 |
| Comp. Ex. 13 | PC3 | 240 | Not heated | 0.25 | 0.25 | 0.22 |

As shown in Table 5, in Examples 16 and 17 wherein surface modification treatment was carried out, the values of the push-pull signal are larger than in Comparative Example 13 wherein no surface modification treatment was carried out. This indicates a possibility that in Comparative Example 13, the guide groove shape of the second recording layer is changed from the groove shape of the stamper (PC3). Whereas, in Examples 16 and 17, it is evident that a second recording layer having a good concave-convex shape is formed by suppressing such a change. Thus, it is considered that according to the process of the present invention, it is possible to obtain an optical recording medium having recording/retrieving of information by light stabilized.

INDUSTRIAL APPLICABILITY

The present invention is widely applicable in an optical field relating to an optical recording medium and is particularly suitable in the case of employing it for the production of an optical recording medium having an interlayer having a concave-convex shape. As a specific example, it is particularly suitable when it is employed for CD, DVD, an optical recording medium using a blue laser, etc.

The entire disclosure of Japanese Patent Application No. 2006-260963 filed on Sep. 26, 2006 including specification, claims, drawings and summary is incorporated herein by reference in its entirety.

The invention claimed is:

1. A process for producing an optical recording medium comprising an interlayer having a concavo-convex shape, the process comprising:

(A) forming a first recording layer comprising an organic dye, on which information is to be recorded by applied light, on a substrate directly or via another layer, then (B) placing a curable resin material layer, formed by coating by spin coating a precursor of the curable resin, followed by a stamper having a concavo-convex shape for transfer corresponding to the concavo-convex shape on the first recording layer directly or via another layer, then (C) partially curing the curable resin material layer in the laminated state, thereby obtaining a bonded body comprising the substrate, the first recording layer, the curable resin material layer and the stamper, then (D) separating the stamper from the curable resin material layer so that the concavo-convex shape for transfer is transferred to the curable resin material layer, and applying surface modification treatment to promote curing of the curable resin material layer having transferred the concavo-convex shape for transfer, thereby forming the interlayer, and then (E) forming a second recording layer by applying a coating liquid comprising an organic dye on the surface of the interlayer.

2. The process of claim 1, wherein the surface modification treatment is at least one selected from the group consisting of an irradiation treatment and a heat treatment.

3. The process of claim 1 or 2, wherein the surface modification treatment is by ultraviolet irradiation with a dose of 50 to 1000 mJ/cm$^2$.

4. The process of claim 1 or 2, wherein the surface modification treatment is by a heat treatment at a heating temperature of 40 to 120° C.

5. The process of claim 1 or 2, wherein the partial curing of the curable resin material layer in (C) is curing up to a half-cured state.

6. The process of claim 1 or 2, wherein the stamper comprises a polycarbonate resin.

7. The process of claim 1 or 2, wherein the curable resin material layer comprises a plurality of resin layers.

8. The process of claim 5, wherein the curable resin material layer comprises a plurality of resin layers, and the partial curing of the outermost layer among the plurality of resin layers is curing up to a half-cured state.

* * * * *